United States Patent
Jin et al.

(10) Patent No.: US 12,395,888 B2
(45) Date of Patent: Aug. 19, 2025

(54) METHOD AND APPARATUS FOR MANAGING TIMER RELATED TO SEGMENTATION TRANSMISSION OF RRC MESSAGE IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Anil Agiwal, Suwon-si (KR); Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 17/785,248

(22) PCT Filed: Dec. 11, 2020

(86) PCT No.: PCT/KR2020/018194
§ 371 (c)(1),
(2) Date: Jun. 14, 2022

(87) PCT Pub. No.: WO2021/125712
PCT Pub. Date: Jun. 24, 2021

(65) Prior Publication Data
US 2023/0025829 A1    Jan. 26, 2023

(30) Foreign Application Priority Data

Dec. 16, 2019    (KR) .................... 10-2019- 0168232

(51) Int. Cl.
*H04W 28/06*    (2009.01)
*H04L 69/325*    (2022.01)
*H04W 76/19*    (2018.01)

(52) U.S. Cl.
CPC .......... *H04W 28/06* (2013.01); *H04L 69/325* (2013.01); *H04W 28/065* (2013.01); *H04W 76/19* (2018.02)

(58) Field of Classification Search
CPC ... H04W 28/06; H04W 76/19; H04W 28/065; H04W 76/25; H04L 69/325
See application file for complete search history.

(56) References Cited

U.S. PATENT DOCUMENTS 9,756,558 B2    9/2017    Sfar
2006/0223537 A1    10/2006    Kojima
(Continued)

FOREIGN PATENT DOCUMENTS

JP    2006-287457 A    10/2006
KR    10-2005-0028254 A    3/2005
(Continued)

OTHER PUBLICATIONS

Qualcomm Incorporated, 'Considerations on RRC message segmentation', R2-1900536, 3GPP TSG-RAN WG2 Meeting #105, Athens, Greece, Feb. 14, 2019.
(Continued)

*Primary Examiner* — Omer S Mian
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. Disclosed is a method for processing a segmented RRC message and operating a timer related thereto.

15 Claims, 14 Drawing Sheets

(56) References Cited

U.S. PATENT DOCUMENTS

| | | | |
|---|---|---|---|
| 2013/0142111 A1 | 6/2013 | Kim et al. | |
| 2021/0218535 A1* | 7/2021 | Liang | H04L 5/0053 |
| 2021/0410039 A1* | 12/2021 | Da Silva | H04W 76/19 |
| 2022/0353944 A1* | 11/2022 | Shih | H04W 72/231 |

FOREIGN PATENT DOCUMENTS

| | | |
|---|---|---|
| KR | 10-1857305 B1 | 6/2018 |
| KR | 10-2021-0057949 A | 5/2021 |

OTHER PUBLICATIONS

Ericsson et al., 'Segmentation in DL', 3GPP TSG-RAN WG2 #108 R2-1915762, Reno, US, Nov. 18-22, 2019 (Revision of R2-1912835).

* cited by examiner

METHOD AND APPARATUS FOR MANAGING TIMER RELATED TO SEGMENTATION TRANSMISSION OF RRC MESSAGE IN NEXT-GENERATION MOBILE COMMUNICATION SYSTEM

TECHNICAL FIELD

The disclosure relates to a method and apparatus for segmenting and transmitting an RRC message and managing a timer related to the segmentation and transmission in a mobile communication system. Furthermore, the disclosure relates to a mobile communication system and relates to a method of segmenting and delivering, by a base station, a downlink RRC message and a UE operation.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

An object to be achieved in an embodiment of the disclosure is to provide a method and apparatus for segmenting and transmitting an RRC message and managing a timer related to the segmentation and transmission in a mobile communication system. Furthermore, an object to be achieved in an embodiment of the disclosure relates to a mobile communication system and is to provide a method of a base station segmenting and delivering a downlink RRC message and a method of a terminal receiving the RRC message.

Solution to Problem

In the disclosure for solving the aforementioned problems, a method by a terminal in a wireless communication system includes transmitting a first radio resource control (RRC) message to a base station, starting a timer based on the first RRC message being transmitted, receiving a plurality of segmented second RRC messages from the base station, and stopping the timer based on all of the plurality of segmented second RRC messages being received, wherein the second RRC message is segmented in plural by the base station based on the second RRC message being greater than a transmittable size.

In some examples, the method further includes restarting the timer based on at least one of the plurality of segmented second RRC messages being received.

In some examples, the method further includes starting a second timer based on at least one of the plurality of segmented second RRC messages being received, and stopping the second timer based on all of the plurality of segmented second RRC messages being received.

In some examples, the timer is a T319 timer, the first RRC message is an RRCResumeRequest message, and the second RRC message is an RRCResume message.

In another example of the disclosure, a method by a base station in a wireless communication system includes receiving a first radio resource control (RRC) message from a user equipment (UE), segmenting, into a plurality of second RRC messages, a second RRC message to be transmitted to the UE based on the second RRC message being greater than a transmittable size, and transmitting the plurality of segmented second RRC messages to the UE, wherein by the UE, a timer is started based on the first RRC message being transmitted, and by the UE, the timer is stopped based on all of the plurality of segmented second RRC messages being received.

In other examples of the disclosure, a user equipment (UE) includes a transceiver capable of transmitting and receiving at least one signal and a controller combined with the transceiver. The controller is configured to transmit a first radio resource control (RRC) message to a base station, start a timer based on the first RRC message being transmitted, receive a plurality of segmented second RRC messages from the base station, and stop the timer based on all of the plurality of segmented second RRC messages being received. The second RRC message is segmented in plural by the base station based on the second RRC message being greater than a transmittable size.

In other examples of the disclosure, a base station includes a transceiver capable of transmitting and receiving at least one signal and a controller combined with the transceiver. The controller is configured to receive a first radio resource control (RRC) message from a user equipment (UE), segment, into a plurality of second RRC messages, a second RRC message to be transmitted to the UE based on the second RRC message being greater than a transmittable size, and transmit the plurality of segmented second RRC messages to the UE. By the UE, a timer is started based on the first RRC message being transmitted. By the UE, the timer is stopped based on all of the plurality of segmented second RRC messages being received.

Advantageous Effects of Invention

According to various embodiments of the disclosure, there can be provided the method and apparatus for segmenting and transmitting an RRC message and managing a timer related to the segmentation and transmission in a mobile communication system.

Furthermore, various embodiments of the disclosure relate to a mobile communication system, and can provide a method of a base station segmenting and delivering a downlink (DL) RRC message and a method of a terminal receiving the RRC message.

Furthermore, according to various embodiments of the disclosure, as a DL segmented RRC message is introduced in an NR system, a DL RRC message greater than a maximum size of a PDCP SDU can be generated and delivered. As a corresponding terminal operation is also established, a base station can deliver a lot of configuration information to a terminal without a problem even with a small latency time.

MODE FOR THE INVENTION

Hereinafter, an operation principle of the disclosure is described in detail with reference to the accompanying drawings. In the following description of the disclosure, a detailed description of a related known function or configuration will be omitted if it is deemed to make the subject matter of the disclosure unnecessarily vague. Furthermore, terms to be described hereinafter may be defined by taking into consideration functions in the disclosure, and may be different depending on a user, an operator's intention or practice. Accordingly, each term should be defined based on contents over the entire specification. Hereinafter, a term for identifying an access node, terms to denote network entities, terms to denote messages, a term to denote an interface between network entities, terms to denote various types of identification information, etc., which are used in the following description, have been exemplified for convenience of description. Accordingly, the disclosure is not limited to terms described later, and another term to denote a target having an equivalent technical meaning may be used.

Hereinafter, for convenience of description, some of terms and names defined in the $3^{rd}$ generation partnership project long term evolution (3GPP LTE) standard may be used. However, the disclosure is not restricted by the terms and names, and may also be identically applied to systems that follow other standards.

With respect to a series of procedures of receiving, by a terminal, a request for a UE capability from a base station and reporting the UE capability in an NR system, there may be introduced a method of segmenting and delivering a UE capability information message if UE capability information is greater than a maximum size of a packet data convergence protocol (PDCP) service data unit (SDU). Likewise, a case where configuration information is greater than a maximum size of a PDCP SDU may occur even in the case of a downlink (DL) radio resource control (RRC) message. Although the case is not currently supported, the transmission of a segmented RRC message may be supported with respect to DL. In various embodiments of the disclosure, when a segment of a DL RRC message is permitted, a timer operation according to the reception of a corresponding DL RRC message may also be affected. Various operations of a terminal and various operations of a base station according to an affected timer operation are defined and described.

Figure 1A:
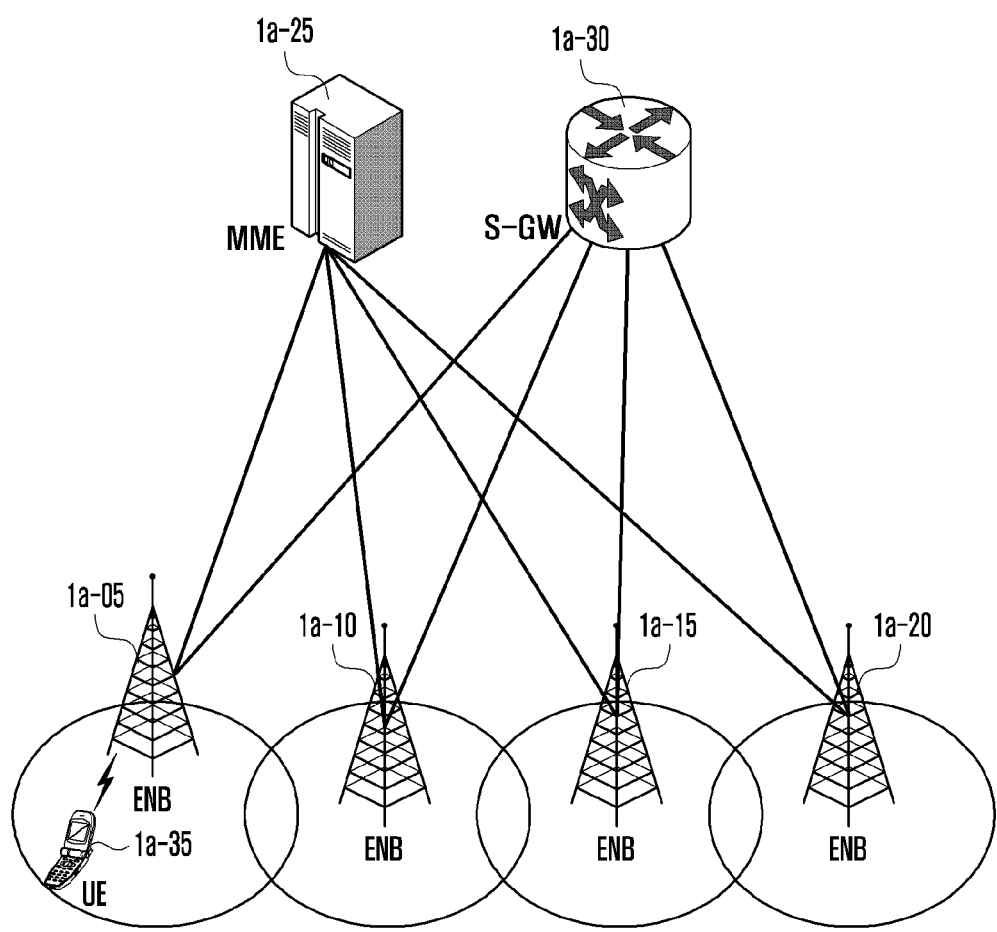
FIG. 1A is a diagram illustrating a structure of an LTE system to which reference is made for a description of the disclosure.

FIG. 1A is a diagram illustrating a structure of an LTE system to which reference is made for a description of the disclosure.

With reference to FIG. 1A, as illustrated, a radio access network of the LTE system is configured with evolved node Bs (hereinafter eNBs, Node Bs or base stations) 1a-05, 1a-10, 1a-15, and 1a-20, a mobility management entity (MME) 1a-25, and a serving-gateway (S-GW) 1a-30. A user equipment (hereinafter a UE or a terminal) 1a-35 accesses an external network through the eNBs 1a-05 to 1a-20 and the S-GW 1a-30.

In FIG. 1A, the eNB 1a-05, 1a-10, 1a-15, 1a-20 corresponds to the existing Node Bs of a universal mobile telecommunication system (UMTS). The eNB 1a-05 is connected to the UE 1a-35 through a wireless channel, and performs a more complex function than the existing Node B. In the LTE system, all of types of user traffic including a real-time service, such as a voice over IP (VoIP), through an Internet protocol, are served through a shared channel. Accordingly, there is a need for an apparatus that performs scheduling by collecting state information, such as buffer states, available transmission power states, channel states, etc. of UEs. The eNB 1a-05, 1a-10, 1a-15, 1a-20 plays a role as the apparatus. In general, One eNB controls multiple cells. For example, in order to implement a transfer rate of 100 Mbps, an LTE system may use orthogonal frequency division multiplexing (hereinafter referred to as OFDM) as a radio access technology in a 20 MHz bandwidth, for example. Furthermore, the LTE system applies an adaptive modulation & coding (hereinafter referred to as AMC) scheme for determining a modulation scheme and a channel coding rate based on a channel state of a UE. The S-GW 1a-30 is an apparatus that provides a data bearer, and creates or removes a data bearer under the control of the MME 1a-25. The MME 1a-25 is an apparatus responsible for various control functions in addition to a mobility management function for the UE, and is connected to multiple base stations.

Figure 1B:
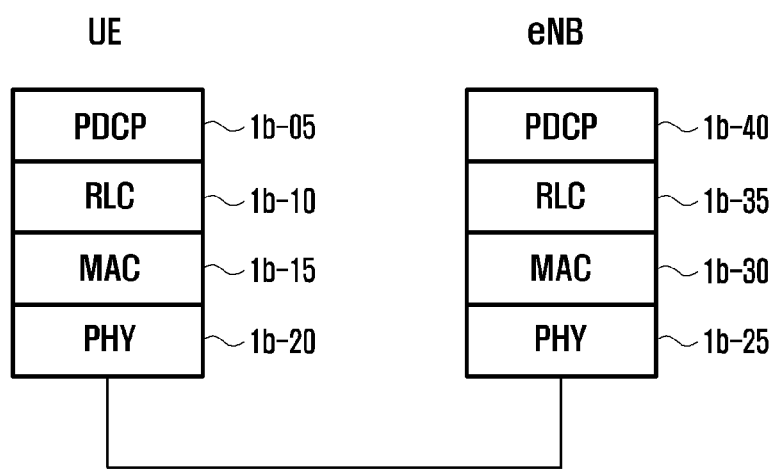
FIG. 1B is a diagram illustrating radio protocol architecture in an LTE system to which reference is made for a description of the disclosure.

FIG. 1B is a diagram illustrating radio protocol architecture in an LTE system to which reference is made for a description of the disclosure.

With reference to FIG. 1B, the radio protocol of the LTE system consists of packet data convergence protocols (PDCPs) 1b-05 and 1b-40, radio link controls (RLCs) 1b-10 and 1b-35, and medium access controls (MACs) 1b-15 and 1b-30 in a UE and an eNB, respectively. The PDCP 1b-05, 1b-40 is responsible for operations, such as IP header compression/restoration. Major functions of the PDCP 1b-05, 1b-40 are summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link control (hereinafter referred to as RLC) 1b-10, 1b-35 reconfigures a PDCP packet data unit (PDU) in a proper size and performs an ARQ operation, etc. Major functions of the RLC 1b-10, 1b-35 are summarized as follows.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment The MAC 1b-15, 1b-30 is connected to several RLC layer entities configured in one UE, and performs an operation of multiplexing RLC PDUs into a MAC PDU and demultiplexing RLC PDUs from a MAC PDU. Major functions of the MAC 1b-15, 1b-30 are summarized as follows.

Mapping between logical channels and transport channels
Multiplexing/demultiplexing of MAC SDUs belonging to one or different logical channels into/from transport blocks (TB) delivered to/from the physical layer on transport channels)
Scheduling information reporting
Error correction through HARQ
Priority handling between logical channels of one UE
Priority handling between UEs by means of dynamic scheduling
MBMS service identification
Transport format selection
Padding The physical layer (PHY) 1b-20, 1b-25 performs an operation of channel-coding and modulating higher layer data, generating the higher layer data into an OFDM symbol, transmitting the OFDM symbol through a wireless channel or demodulating an OFDM symbol received through a wireless channel, channel-decoding the OFDM symbol, and transmitting the OFDM symbol to a higher layer. Furthermore, a hybrid ARQ (HARQ) is used for additional error correction even in the physical layer. A reception stage transmits, as 1 bit, whether a packet transmitted by a transmission stage is received. This is called HARQ ACK/NACK information. Downlink HARQ ACK/NACK information for uplink transmission may be transmitted through a physical hybrid-ARQ indicator channel (PHICH) physical channel. Uplink HARQ ACK/NACK information for DL transmission may be transmitted through a physical uplink control channel (PUCCH) or a physical uplink shared channel (PUSCH) physical channel.

Meanwhile, the PHY layer may consist of one or a plurality of frequencies/carriers. A technology for simultaneously configuring and using a plurality of frequencies is called a carrier aggregation (hereinafter referred to as a CA) technology. The CA technology can significantly increase the transfer rate as much as the number of subcarriers by additionally using a main carrier and one or a plurality of subcarriers, instead of using only one carrier for communication between a terminal (or a user equipment (UE)) and a base station (E-UTRAN NodeB, eNB). Meanwhile, in LTE, a cell within a base station, which use a main carrier, is called a primary cell (PCell), and a subcarrier is called a secondary cell (SCell).

Although not illustrated in this drawing, a radio resource control (hereinafter referred to as RRC) layer is present in a high rank of the PDCP layer of each of a terminal and a base station. The RRC layer may exchange configuration control messages related to access or measurement for radio resource control.

Figure 1C:
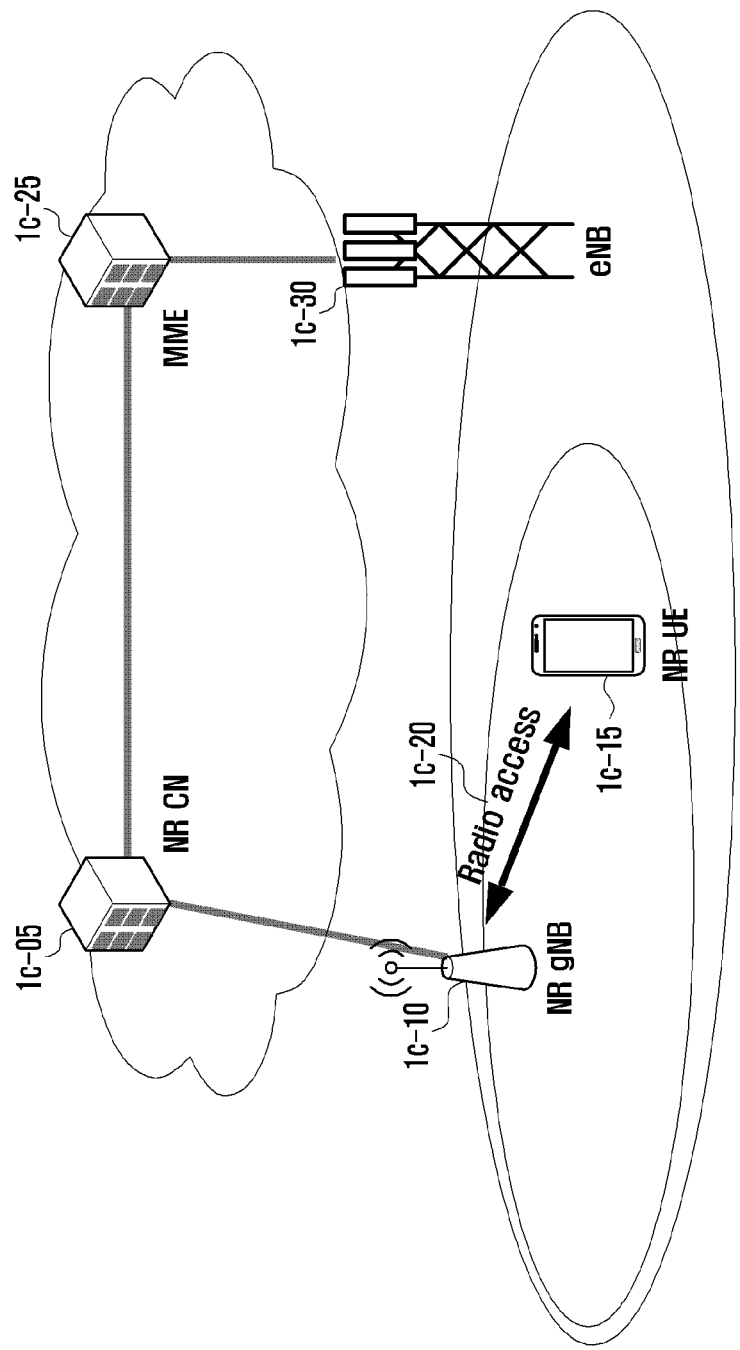
FIG. 1C is a diagram illustrating a structure of a next-generation mobile communication system to which the disclosure is applied.

FIG. 1C is a diagram illustrating a structure of a next-generation mobile communication system to which the disclosure is applied.

With reference to FIG. 1C, a radio access network of the next-generation mobile communication system is configured with a new radio Node B (hereinafter an NR NB) 1c-10 and a new radio core network (NR CN or a next generation core network (NG CN)) 1c-05. A new radio user equipment (hereinafter an NR UE or a terminal) 1c-15 accesses an external network through the NR NB 1c-10 and the NR CN 1c-05.

In FIG. 1C, the NR NB 1c-10 corresponds to an evolved Node B (eNB) of the existing LTE system. The NR NB is connected to the NR UE 1c-15 through a wireless channel, and may provide a more excellent service than the existing Node B. In the next-generation mobile communication system, all of types of user traffic are served through a shared channel. Accordingly, there is a need for an apparatus that performs scheduling by collecting state information, such as buffer states, available transmission power states, and channel states of UEs. The NR NB 1c-10 plays a role as the apparatus. In general, one NR NB controls multiple cells. In order to implement ultra-high speed data transmission compared to the existing LTE, a bandwidth higher than the existing maximum bandwidth may be used. Furthermore, a beamforming technology may be additionally grafted by using orthogonal frequency division multiplexing (hereinafter OFDM) as a radio access technology. Furthermore, an adaptive modulation & coding (hereinafter referred to as AMC) scheme for determining a modulation scheme and a channel coding rate based on a channel state of a UE is applied. The NR CN 1c-05 performs functions, such as mobility support, a bearer configuration, and a QoS configuration. The NR CN 1c-05 is an apparatus responsible for various control functions in addition to a mobility management function for a UE, and is connected to multiple base stations. Furthermore, the next-generation mobile communication system may also operate in conjunction with the existing LTE system. The NR CN 1c-05 is connected to an MME 1c-25 through a network interface. The MME 1c-25 is connected to an eNB 1c-30, that is, the existing base station.

Figure 1D:
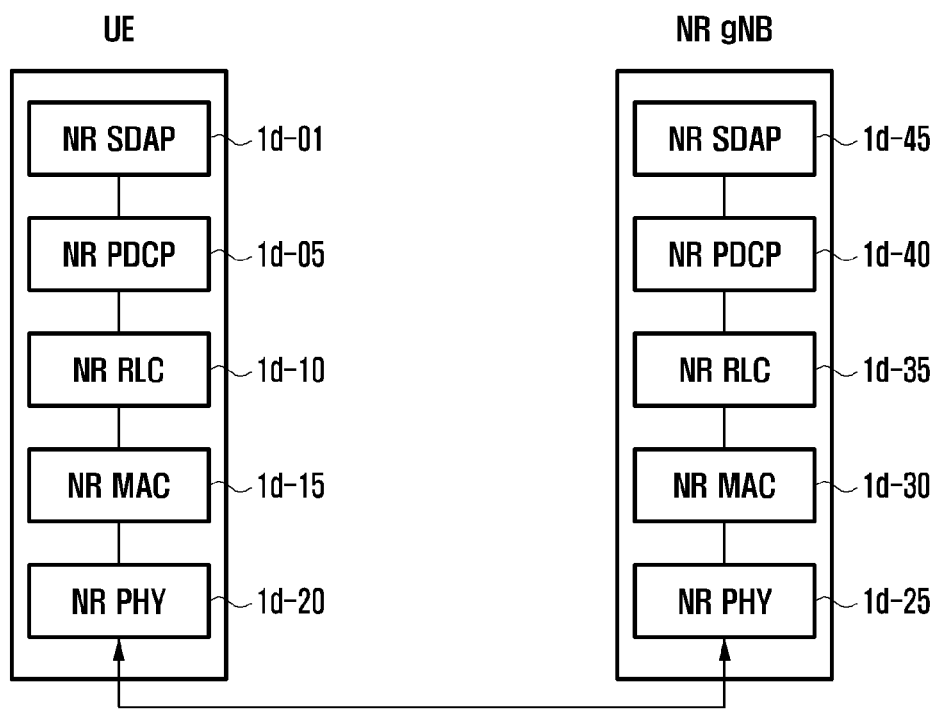
FIG. 1D is a diagram illustrating radio protocol architecture of a next-generation mobile communication system to which the disclosure may be applied.

FIG. 1D is a diagram illustrating radio protocol architecture of a next-generation mobile communication system to which the disclosure may be applied.

With reference to FIG. 1D, the radio protocol of the next-generation mobile communication system consists of NR SDAPs 1d-01 and 1d-45, NR PDCPs 1d-05 and 1d-40, NR RLCs 1d-10 and 1d-35, and NR MACs 1d-15 and 1d-30, in a UE and an NR NB, respectively.

Major functions of the NR SDAP 1d-01, 1d-45 may include some of the following functions.
 Transfer of user plane data
 Mapping between a QoS flow and a DRB for both DL and UL
 Marking QoS flow ID in both DL and UL packets
 Reflective QoS flow to DRB mapping for the UL SDAP PDUs.

With respect to an SDAP layer apparatus, whether to use the header of the SDAP layer apparatus or whether to use a function of the SDAP layer apparatus for each PDCP layer apparatus or for each bearer or for each logical channel may be configured for the UE through an RRC message. If an SDAP header has been configured, the UE may be instructed to update or reconfigure a QoS flow of the uplink and the DL and mapping information for a data bearer through an NAS QoS reflective configuration 1-bit indicator (NAS reflective QoS) of the SDAP header and an AS QoS reflective configuration 1-bit indicator (AS reflective QoS). The SDAP header may include QoS flow ID information indicative of QoS. QoS information may be used as data processing priority, scheduling information, etc. for supporting a smooth service.

Major functions of the NR PDCP 1d-05, 1d-40 may include some of the following functions.
 Header compression and decompression: ROHC only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink In the above description, the reordering of the NR PDCP apparatus refers to a function of sequentially reordering PDCP PDUs, received from a lower layer, based on a PDCP sequence number (SN), may include a function of delivering data to a higher layer in a reordered sequence, may include a function of directly delivering data without considering a sequence, may include a function of reordering sequences of data and recording lost PDCP PDUs, may include a function of transmitting, to a transmission side, a state report for lost PDCP PDUs, and may include a function of requesting the retransmission of lost PDCP PDUs.

Major functions of the NR RLC 1d-10, 1d-35 may include some of the following functions.
 Transfer of upper layer PDUs
 In-sequence delivery of upper layer PDUs
 Out-of-sequence delivery of upper layer PDUs
 Error Correction through ARQ
 Concatenation, segmentation and reassembly of RLC SDUs
 Re-segmentation of RLC data PDUs
 Reordering of RLC data PDUs
 Duplicate detection
 Protocol error detection
 RLC SDU discard
 RLC re-establishment In the above description, the In-sequence delivery of the NR RLC apparatus refers to a function of sequentially delivering, to a higher layer, RLC SDUs received from a lower layer, may include a function of reassembling and delivering RLC SDUs if the original one RLC SDU is spit into the several RLC SDUs and received, may include a function of reordering received RLC PDUs based on an RLC sequence number (SN) or a PDCP sequence number (SN), may include a function of reordering sequences of received RLC PDUs and recording lost RLC PDUs, may include a function of transmitting, to a transmission side, a state report for lost RLC PDUs, may include a function of requesting the retransmission of lost RLC PDUs, may include a function of sequentially delivering, to a higher layer, only RLC SDUs up to a lost RLC SDU when the lost RLC SDU is present, or may include a function of sequentially delivering, to a higher layer, all RLC SDUs received before a given timer starts if the given timer has expired although a lost RLC SDU is present, or may include a function of sequentially delivering, to a higher layer, all RLC SDUs received so far if a given timer has expired although a lost RLC SDU is present. Furthermore, in the above description, RLC PDUs may be processed in sequences in which the RLC PDCUs are received (in order of arrival regardless of their sequence numbers) and delivered to the PDCP apparatus. In the case of a segment, segments stored in a buffer or to be subsequently received may be received, may be reconfigured into the entire one RLC PDU, may be then processed, and may be delivered to the PDCP apparatus. The NR RLC layer may not include the concatenation function, and the concatenation function may be performed by the NR MAC layer or may be substituted with the multiplexing function of the NR MAC layer.

In the above description, the Out-of-sequence delivery of the NR RLC apparatus refers to a function of directly delivering, to a higher layer, RLC SDUs received from a lower layer regardless of their sequences, may include a function of reassembling and delivering several RLC SDUs if the original one RLC SDU has been split into the several RLC SDUs and received, and may include a function of storing RLC SNs or PDCP SNs of received RLC PDUs, ordering the sequences of the RLC PDUs, and recording lost RLC PDUs.

The NR MAC 1*d*-15, 1*d*-30 is connected to several NR RLC layer apparatuses configured in one UE. Major functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 1*d*-20, 1*d*-25 may perform an operation of channel-coding and modulating high layer data, generating the data into an OFDM symbol, and transmitting the OFDM symbol through a wireless channel or demodulating an OFDM symbol received through a wireless channel, channel-decoding the OFDM symbol, and delivering the OFDM symbol to a higher layer.

Figure 1E:
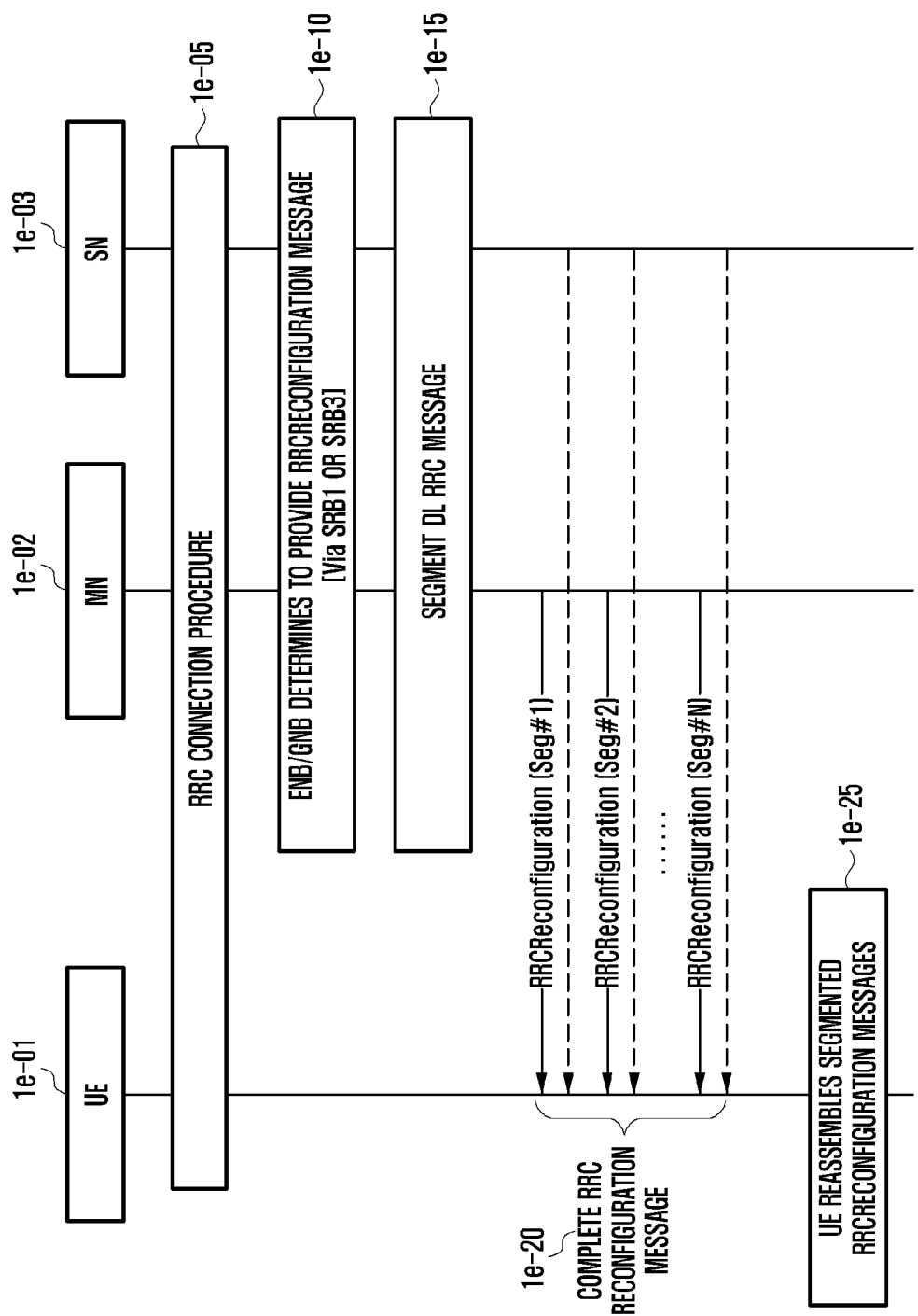
FIG. 1E is a diagram illustrating a method of applying segmentation to an RRC message through downlink (DL) in an NR system to which reference may be made for the disclosure.

FIG. 1E is a diagram illustrating a method of applying segmentation to an RRC message through DL in an NR system to which reference may be made for the disclosure. An RRCReconfiguration message and an RRCResume message are possible as examples of an RRC message. A specific DL RRC message that needs to be segmented due to a large size may be applied as an RRC message. In the following description of the disclosure, an RRCReconfiguration message is described as an example, but the scope of right of the disclosure is not limited to RRCReconfiguration.

Basically, a UE 1*e*-01 may need to receive configuration information for the transmission and reception of data to and from a serving base station (e.g., a master node (MN) or an eNB or a gNB) 1*e*-02 in the state (1*e*-05) in which the UE has been connected to the base station. In step 1*e*-10, the base station 1*e*-02, 1*e*-03 may determine that it has to deliver an RRCReconfiguration message to the UE 1*e*-01, and may generate corresponding information. The following case may occur with respect to a method of delivering RRCReconfiguration in the state in which dual connectivity (hereinafter named DC) has been configured as in FIG. 1E.

Case 1: if the master node (MN) 1*e*-02 generates an RRC message including master cell group (MCG) configuration information, in this case, the base station may deliver the generated RRC message through a signaling radio bearer1 (SRB1).

Case 2: if the MN 1*e*-02 receives configuration information from the secondary node (SN) 1*e*-03 and generates an RRC message including MCG/secondary cell group (SCG) configuration information, in this case, the base station may deliver the generated RRC message through an SRB1.

Case 3: if the SN 1*e*-03 generates an RRC message including SCG configuration information, in this case, the base station may deliver the generated RRC message through an SRB3.

In step 1*e*-15, when the RRC message generated in step 1*e*-10 is greater than a maximum size of a PDCP SDU (e.g., 9000 bytes. Hereinafter, 9000 bytes are described as an example, but the disclosure is not limited thereto), the base station may apply segmentation to the corresponding RRC message (e.g., an RRCReconfiguration message). For example, the entire RRCReconfiguration message may be segmented into segments having a 9000-byte size, and the last segment may be a segment having a size left after the sum of segmented RRC messages is subtracted from the entire message size. In step 1*e*-20, the base station 1*e*-02, 1*e*-03 may deliver the produced segmented RRC messages (segmented RRCReconfiguration messages) to the UE 1*e*-01 one by one. In this case, the delivered segmented RRC messages need to be sequentially delivered according to their sequence numbers and should not be interrupted by another RRC message. That is, another RRC message is not delivered while the segmented RRC messages are delivered. In step 1*e*-25, after receiving all the segmented RRC messages, the UE 1*e*-01 may recover the entire RRC message information by decoding and reassembling the received segmented RRC messages.

Figure 1F:
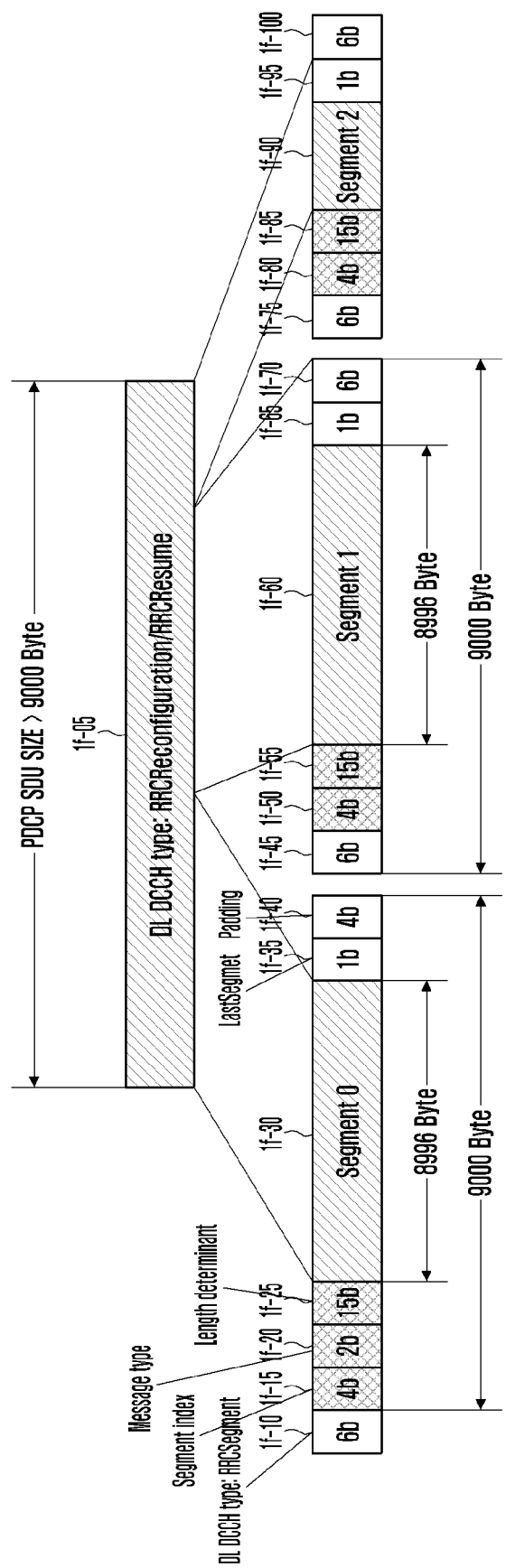
FIG. 1F is a diagram illustrating a method of applying segmentation to a DL RRC message in an NR system.

FIG. 1F is a diagram illustrating a method of applying segmentation to a DL RRC message in an NR system. In FIG. 1F, a detailed structure of segmented messages is described, and an RRCReconfiguration message or an RRCResume message is described as an example.

If segmentation based on a DL dedicated control channel (DCCH) message is applied, a new DL segmented RRC message may be introduced. For example, a new DL DCCH message called DLDedicatedMessageSegment may be introduced and used to deliver DL segmented RRC. When a completed DL DCCH message 1*f*-05, for example, a DL DCCH message including an RRCReconfiguration message is greater than 9000 bytes, as in 1*f*-30 and 1*f*-60, a base station may segment the corresponding message as 8996 bytes and may add a DL segmented RRC message header of 4 bytes. In this case, the message header size and the size of the segmented RRC message may vary depending on the size of an introduced field. The last segment message 1*f*-90 may have a size obtained by subtracting, from the entire size, the sum of the sizes of segments having the 9000 byte length.

The header of the DL segmented RRC message may require 6 bits (1*f*-10, 1*f*-45, 1*f*-75: a CHOICE structure and the number of bits for indicating a DLDedicatedMessageSegment message) for a DL DCCH type configuration, and a segment index (1*f*-15, 1*f*-50, 1*f*-80) of 4 bits used for a corresponding segmented UE capability information message. Furthermore, a message type field (2 bits, 1f-25) proposed in the disclosure may be bits that determine that an RRC message included in a DL segmented message is which message, for example, an indicator that determines an RRCReconfiguration message and an RRCResume message. In an example of the disclosure, 2 bits for determining a total of four messages by assuming an RRCReconfiguration message, an RRCResume message, and two spare messages are assumed, but the size of a message type field (2 bits, 1f-25) may vary depending on the number and spare values of included RRC messages. The message type field (2 bits, 1f-25) may be included in only the first segmented RRC message. This may be different from the existing operation of a terminal being aware that a corresponding message is which RRC message after decoding the original RRC message, after receiving all segments.

In a subsequent embodiment, the reason why this field is introduced is described in detail. Summarized in brief, an application timer operation is different depending on that a DLDedicatedMessageSegment message is which RRC message when a terminal receives the DLDedicatedMessageSegment message. The reason for this is that if which RRC message has been segmented is identified simultaneously with the reception of the first segment, the application of a timer operation by the terminal and a required terminal operation can be accurately performed. Furthermore, the message type field (2 bits, 1f-25) may be identically included in all segments for consistency.

The segment index is an identifier indicating that a corresponding segmented RRC message corresponds to any one of segments, which is a case where a maximum segment size is configured as 16, for example, and the number of bits may vary depending on a maximum configuration value. Since a corresponding segment can be delivered in a sequence way through a PDCP SN, a corresponding identifier may be always included, but may not be present. Instead, an indicator (1 bit, 1f-35, 1f-65, 1f-95) indicating whether a specific segment is the final segment needs to be included in a corresponding header. If a corresponding LastSegment indicator is indicated as 0 and thus indicates that a specific segment is not the last segment, a base station that receives a corresponding message may be aware that a corresponding packet has a maximum size. Furthermore, a padding bit 1f-35, 1f-65, 1f-95 for byte-aligning the packet may be added. The padding bit may be variable depending on a previous header bit, a segment size, etc. Furthermore, a length field indicating the length of a segmented RRC message may require 15 bits. This may mean the number of bits for indicating 8996 bytes.

If the size of a PDCP SDU is adjusted to 9000 in a method of filling the size, a PDCP SN may be added and a PDCP PDU may be generated.

In the following embodiments of the disclosure, if segmentation is applied to a DL RRC message, an RRCReconfiguration message, and an RRCResume message, a problem in a timer operation according to the reception of the corresponding messages is described, and a series of solutions for solving the problem are proposed. Timer operations taken into consideration in the disclosure may include T304, T310, T319, etc. below. For detailed operation, reference is made to Table 1 below.

TABLE 1

| Timer | Start | Stop | At expiry |
|---|---|---|---|
| T304 | When receiving an RRCReconfiguration message including reconfiguration WithSync (i.e., a case where a handover configuration is included) | Upon completion of random access for a target cell to which handover is applied: Or if a corresponding SCG is released upon PSCell change | With respect to a handover request for an MCG, perform an RRC re-establishment operation when a timer expires: With respect to a PSCell change request for an SCG, perform an SCG failure information delivery procedure when a timer expires: |
| T310 | When receiving an out-of-sync indicator from a physical layer N310 times (i.e., a case where a physical layer problem is detected) | When receiving an in-sync indicator N311 times from a physical layer: When receiving an RRCReconfiguration message including reconfigurationWithSync: When performing an RRC re-establishment operation: Or stop T310 corresponding to an SCG when receiving SCG release | If T310 operates in an MCG and As security has not been activated, transitions to RRC IDLE: If T310 operates in an MCG and As security has been activated, performs an RRC re-establishment procedure: Trigger a T310 operation for an SCG, an SCG failure information delivery procedure |
| T319 | When transmitting an RRCResumeRequest message | When receiving an RRCResume message: Or when receiving an RRCSetup, RRCRelease, RRCReject message | Transitions to RRC IDLE |

In particular, in the case of T304, an operation of the timer starting has been specified based on the reception of an RRCReconfiguration message including contents indicative of handover. In the case of T319, an operation of stopping the T319 timer that starts when an RRCResumeRequest message is transmitted when an RRCResume message is received is specified.

With respect to a segmented RRC message, after receiving all of corresponding DL segment messages, a terminal may combine all the DL segment messages and decode the DL segment messages into an original RRC message. That is, after receiving all the segments and decoding the original message, a terminal can be aware that the corresponding message is which type of message and includes which information. However, in the case of the aforementioned specific timer (T304, T319), timer start and stop operations are determined in association with the time when a specific DL message is received. If a corresponding DL RRC message is not segmented, a terminal receives the corresponding message and performs a timer operation at the moment when the terminal checks the contents of the corresponding message. However, although the corresponding message is a DL RRC message including the same contents, if the message has been segmented and delivered, the terminal may recover the corresponding RRC message and check contents thereof even after receiving all of corresponding segments. That is, a message that is segmented and delivered and a message that is not segmented affect a terminal processing speed. This means that a case where a message is segmented and delivered has a performance reduction from a timer processing viewpoint.

Figure 1G:
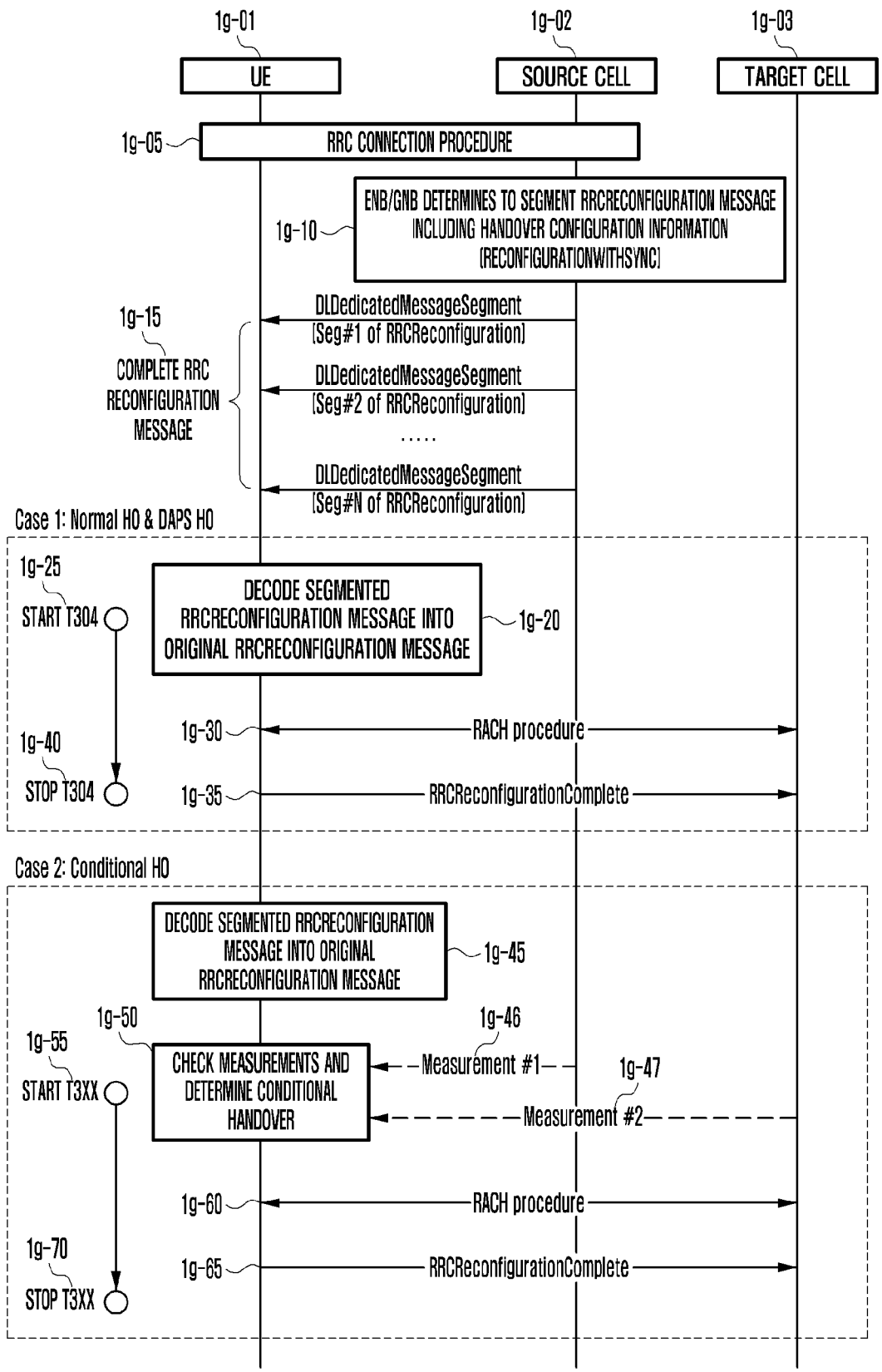
FIG. 1G is Embodiment 1 to which the disclosure is applied, illustrates an overall operation in a situation in which segmentation is applied to a DL RRC message, and, specifically, is a diagram illustrating an operation according to a specific situation.

FIG. 1G is Embodiment 1 to which the disclosure is applied, illustrates an overall operation in a situation in which segmentation is applied to a DL RRC message, and, specifically, is a diagram illustrating an operation according to a specific situation. The RRC message may be an RRCReconfiguration message. In particular, Embodiment 1 is an example in which the size of an RRC message including handover configuration information (reconfigurationWithSync) is greater than a maximum size of a PDCP SDU, segmentation is applied to the RRC message, and the RRC message is delivered to a UE. Embodiment 1 is characterized by detailed contents related to a timer operation.

A UE 1g-01 may need to receive configuration information for the transmission and reception of data to and from a serving base station (eNB or gNB, a source base station in the drawing) 1g-02 in the state (1g-05) in which the UE has been connected to the base station. In step 1g-05, the UE 1g-01 and the base station 1g-02 may perform a series of operations of requesting and delivering UE capability information. In step 1g-05, when the UE 1g-01 delivers UE capability information to the base station 1g-02, the UE capability information may include information indicating whether segmentation for an UL/DL RRC message is supported. In the method of delivering the UE capability, UL/DL capabilities may be separately indicated for each RAT type. For example, the capability to support segmentation for an UL/DL RRC message in LTE and the capability to support segmentation for an UL/DL RRC message in NR may be separately delivered.

In step 1g-10, the serving base station 1g-02 may determine that it has to deliver an RRC message to the UE 1g-01, and may generate corresponding information. The RRC message may be an RRCReconfiguration message. This is also associated with the RRC segmentation UE capability delivered by the UE 1g-01 in step 1g-05. The base station 1g-02 may segment and deliver the RRC message to the UE 1g-01 having a specific RAT-type and an UL/DL RRC message segmentation capability. That is, in case that the generated RRC message is greater than 9000 bytes, that is, a maximum size of a PDCP SDU, the base station may apply segmentation to the corresponding RRC message (e.g., an RRCReconfiguration message). In an embodiment of the disclosure, a case where handover configuration information (reconfigurationWithSync) is included in an RRC message may be taken into consideration. The base station 1g-02 may deliver the segments of an RRC message including corresponding information by including the segments in a segmented DL RRC message. The segmented DL RRC message may be DLDedicatedMessageSegment. That is, the entire RRC message may be segmented into segments having a 9000-byte size, and the last segment may be a segment having a size left after the sum of segmented RRC messages is subtracted from the entire message size.

In step 1g-15, the base station 1g-02 may deliver the produced segmented RRC messages (e.g., segmented RRCReconfiguration messages) to the UE 1g-01 one by one through a configured SRB. The segmented RRC message may be DLDedicatedMessageSegment. In this case, the delivered segmented RRC messages need to be sequentially delivered according to their sequence numbers (or segmented indices), and should not be interrupted by another RRC message. That is, another RRC message is not delivered while the segmented RRC messages are delivered. As in step 1g-15, from a viewpoint of a UE, all of segmented RRC (DLDedicatedMessageSegment) messages are received, and may be delivered as the original message by recovering the corresponding segmented RRC messages. For example, if a total of N segmented RRC messages are present, the corresponding segment RRC messages may be delivered to a UE through a configured SRB. When identifying the last N-th segmented RRC message, the UE may identify that the last N-th segmented RRC message is the last segment through the last segment indicator.

In the following paragraph, a common handover situation or a dual active protocol stack (DAPS) handover situation, that is, the first scenario in the present embodiment, are taken into consideration. In step 1g-20, the UE 1g-01 may identify that the original RRC message is an RRC message including handover configuration information by recovering the segment RRC messages received in step 1g-15. In this case, the UE 1g-01 may apply a handover configuration included in the corresponding message and perform a proper timer-related operation. That is, if the T310 timer that is currently operating is present, the UE may stop the T310 timer, and may operate the T304 timer (1g-25). As a detailed description of the handover operation, in step 1g-30, the UE 1g-01 may perform a random access procedure on a target cell 1g-03 to which handover has been indicated. When random access with the target cell 1g-03 is completed, in step 1g-35, the UE 1g-01 may deliver the RRC message to the target cell 1g-03. The RRC message may be an RRCReconfigurationComplete message. The corresponding operation means that a handover operation for the target cell 1g-03 is completed. In the above step, the UE 1g-01 may stop the T304 timer that is operating (1g-40). If the handover operation is not performed until the T304 expires, the UE 1g-01 may perform an RRC re-establishment operation or recover a connection state for the original serving cell as described in Table 1.

In the following paragraph, a conditional handover (CHO) situation, that is, the second scenario in the present embodiment, is taken into consideration. In step 1g-45, the UE 1g-01 may identify that the original RRC message is an RRC message including handover configuration information (e.g., an RRCReconfiguration message) by recovering the segment RRC messages received in step 1g-15. In this case, the UE 1g-01 may apply a handover configuration included in the corresponding message, in particular, a CHO configuration, and may perform a proper timer-related operation. That is, while the UE performs channel measurement (1g-46 and 1g-47) for target cells to which the CHO configuration is applied, when a condition (e.g., when channel performance of a target cell is greater than a critical value) in which CHO is performed is satisfied, the UE may perform handover to the corresponding target cell. In this case, if the T310 timer that is currently operating is present, the UE may stop the T310 timer, and may operate a T3xx timer (the same operation as a CHO-dedicated timer: T304, and the T3xx timer is started when handover to the corresponding target cell is determined) (1g-55). As a detailed description of the handover operation, in step 1g-60, the UE 1g-01 may perform a random access procedure on the target cell 1g-03 to which handover has been indicated. When random access with the target cell 1g-03 is completed, in step 1g-65, the UE 1g-01 may deliver the RRC message to the target cell 1g-03. The RRC message may be an RRCReconfigurationComplete message. The corresponding operation means that the handover operation for the target cell 1g-03 is completed. The UE 1g-01 may stop the T3xx timer that is operating in the above step (1g-70). If the handover operation is not performed until the T3xx expires, the UE 1g-01 may perform an RRC re-establishment operation or recover a connection state for the original serving cell.

A case where the UE 1g-01 in the present embodiment segments and delivers an RRC message (e.g., an RRCReconfiguration message) including handover configuration information has been described. From a viewpoint of the UE 1g-01, T304 (or T3xx) start timing may be delayed compared to a case where a not-segmented message is received, but it may be seen that there is no problem with an operation. However, an operation of the UE 1g-01 in the case where a corresponding message has been received is slightly different from the existing operation. The UE operates based on the contents described in the present embodiment.

Figure 1H:
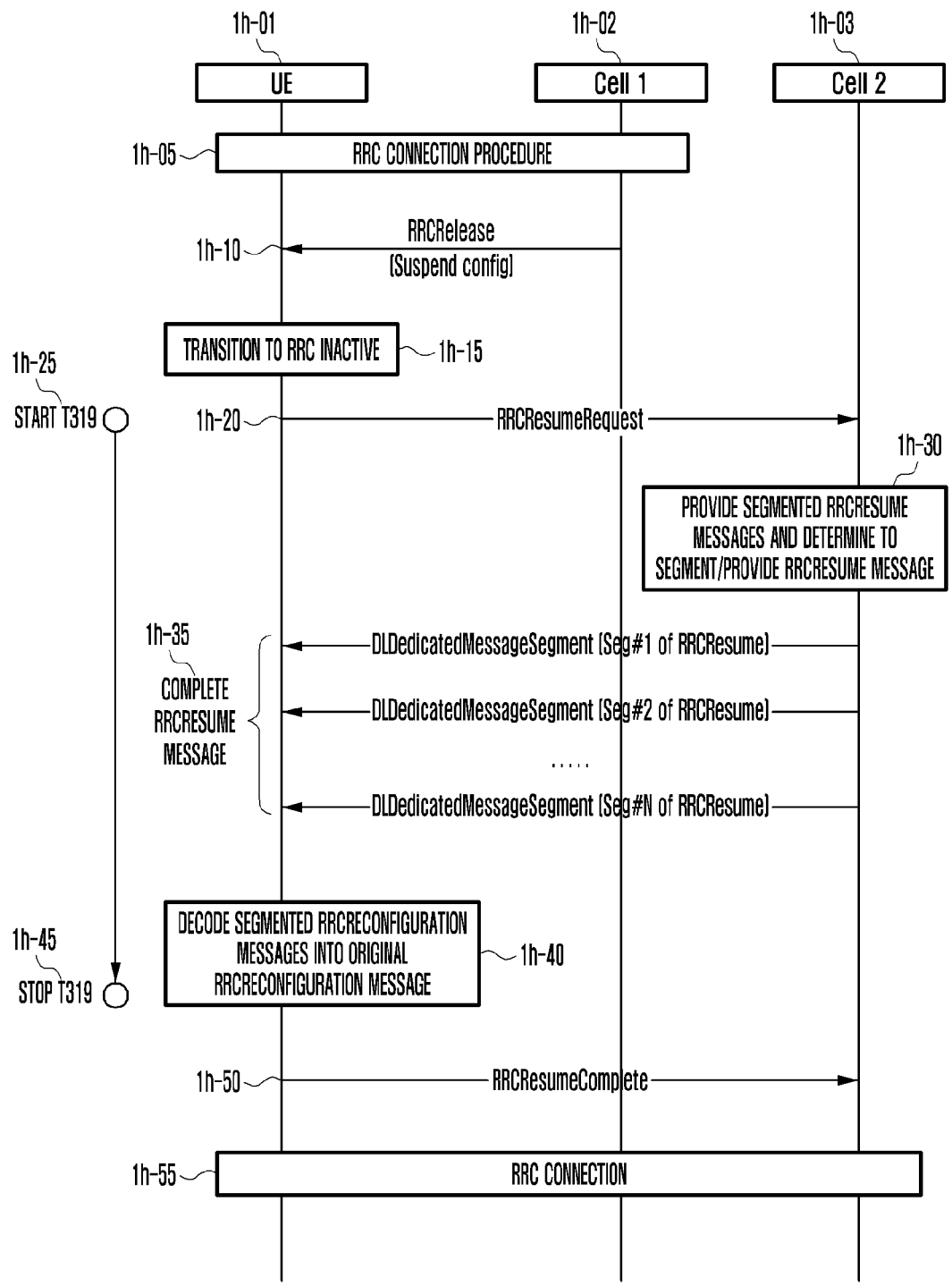
FIG. 1H is Embodiment 2 to which the disclosure is applied, illustrates an overall operation in a situation in which segmentation is applied to a DL RRC message, and is a diagram illustrating detailed contents related to a timer operation.

FIG. 1H is Embodiment 2 to which the disclosure is applied, illustrates an overall operation in a situation in which segmentation is applied to a DL RRC message, and is a diagram illustrating detailed contents related to a timer operation. The RRC message may be an RRCResume message.

Basically, a UE 1h-01 needs to receive configuration information for the transmission and reception of data to and from a serving base station (eNB or gNB, a Cell 1 1h-02 in the drawing) in the state (1h-05) in which the UE has been connected to the base station. In step 1h-05, the UE 1h-01 and the base station 1h-02 may perform a series of operations of requesting and delivering UE capability information. In the corresponding step, if the UE 1h-01 delivers UE capability information to the base station 1h-02, the UE capability information may include information indicating whether segmentation for an UL/DL RRC message is supported. In the method of delivering UE capability, UL/DL capabilities may be separately indicated for each RAT type. For example, the capability to support segmentation for an UL/DL RRC message in LTE and the capability to support segmentation for an UL/DL RRC message in NR may be separately delivered. For reference, specific cell-based timer information may be delivered to the UE 1h-01 in system information (SIB1). With reference to Table 2, T319 referred in the present embodiment is also included in the system information (SIB1).

TABLE 2

| UE-TimersAndConstants ::= | SEQUENCE { |
|---|---|
| t300 | ENUMERATED {ms100, ms200, ms300, ms400, ms600, ms1000, ms1500, ms2000}, |
| t301 | ENUMERATED {ms100, ms200, ms300, ms400, ms600, ms1000, ms1500, ms2000}, |
| t310 | ENUMERATED {ms0, ms50, ms100, ms200, ms500, ms1000, ms2000}, |
| n310 | ENUMERATED {n1, n2, n3, n4, n6, n8, n10, n20}, |
| t311 | ENUMERATED {ms1000, ms3000, ms5000, ms10000, ms15000, ms20000, ms30000}, |
| n311 | ENUMERATED {n1, n2, n3, n4, n5, n6, n8, n10}, |
| t319 | ENUMERATED {ms100, ms200, ms300, ms400, ms600, ms1000, ms1500, ms2000}, |
| ... | |
| } | |

In step 1h-10, the base station 1h-02 may deliver an RRC message that makes the UE transition to an INACTIVE state due to a reason, such as a case where the transmission and reception of data to and from the UE 1h-01 are not performed for a given time and expected data transmission and reception are not present. The RRC message may be an RRCRelease message. The RRCRelease message may include a suspend configuration indicative of a configuration to the INACTIVE state. For reference, suspend configuration information may include an I-radio network temporary identifier (I-RNTI), a RAN paging cycle, RAN notification area information, T380, a next hop chain count (NCC) value, etc. In step 1h-15, the UE 1h-01 that has received the message may transition to an RRC INACTIVE state. Thereafter, the UE 1h-01 may need to transition to an RRC connected state for a reason, such as data generation from a higher layer. In step 1h-20, the UE 1h-01 may request an RRC resume operation from a specific base station (Cell 2, 1h-03) through an RRC message (e.g., an RRCResumeRequest message). If the Cell 1 1h-02 and a Cell 2 1h-03 are tied up in the same RAN notification area, an RRC resume procedure may be performed because context of the UE 1h-01 can be recovered between the corresponding cells. In step 1h-20, the UE 1h-01 may start the T319 timer (1h-25) simultaneously with the transmission of an RRC message (e.g., an RRCResumeRequest message). An operation of the base station 1h-03 that has received the RRC message may be different depending on a response to the message.

Reject an RRC Resume request

RRCReject message delivery: instruct the UE to make an RRCResume request again (including a wait time)

RRCRelease message delivery: make the UE transition to the RRC IDLE state

Deliver an RRCRelease message (including a suspend configuration): make the UE transition to the RRC INACTIVE state Approve an RRC Resume request If a corresponding cell can recover UE context: deliver RRCResume If a corresponding cell cannot recover UE context: deliver RRCSetup In particular, in the present embodiment, a scenario in which if the UE has requested RRCResumeRequest, the base station (Cell 2, 1h-03) may invoke UE context and permits the Resume request of the UE is taken into consideration. Referring to Table 3, the base station 1h-03 may generate the following RRCResume message. The message may include a master cell group configuration, a bearer configuration, a measurement configuration, etc.

TABLE 3

| | |
|---|---|
| RRCResume ::= | SEQUENCE { |
| rrc-TransactionIdentifier | RRC-TransactionIdentifier, |
| criticalExtensions | CHOICE { |
| rrcResume | RRCResume-IEs, |
| criticalExtensionsFuture | SEQUENCE { } |
| } | |
| } | |
| RRCResume-IEs ::= | SEQUENCE { |
| radioBearerConfig | RadioBearerConfig |
| OPTIONAL, -- Need M | |
| masterCellGroup | OCTET STRING (CONTAINING CellGroupConfig) |
| OPTIONAL, -- Need M | |
| measConfig | MeasConfig |
| OPTIONAL, -- Need M | |
| fullConfig | ENUMERATED {true} |
| OPTIONAL, -- Need N | |
| lateNonCriticalExtension | OCTET STRING |
| OPTIONAL, | |
| nonCriticalExtension | RRCResume-v1560-IEs |
| OPTIONAL | |
| } | |
| RRCResume-v1560-IEs ::= | SEQUENCE { |
| radioBearerConfig2 | OCTET STRING (CONTAINING RadioBearerConfig) |
| OPTIONAL, -- Need M | |
| sk-Counter | SK-Counter |
| OPTIONAL, | |
| nonCriticalExtension | SEQUENCE{ } |
| OPTIONAL | |
| } | |

In step 1h-30, the generated RRCResume message may be greater than a maximum size of a PDCP SDU. In this case, the base station 1h-03 may segment the corresponding message. This may be a case where the UE 1h-01 has a segment processing capability for a DL RRC message. Segmented RRC messages may be included in DLDedicatedMessageSegment described with reference to FIG. 1E and delivered. The RRC message may be an RRCResume message. That is, the entire RRCResume message is segmented into segments having a 9000-byte size. The last segment may be a segment having a size left after the sum of segmented RRC messages is subtracted from the entire message size.

In step 1h-35, the base station 1h-03 may sequentially deliver the generated segmented RRC messages (e.g., DLDedicatedMessageSegment messages) to the UE 1h-01. As in 1h-40, from a viewpoint of the UE, the UE 1h-01 may receive all the segmented RRC (DLDedicatedMessageSegment), may recover the corresponding segmented RRC messages, and may identify the corresponding segmented RRC messages as the original message. For example, if a total of N segmented RRC messages are present, if the corresponding segment RRC messages have been delivered to the UE 1h-01 through a configured SRB and the last N-th segmented RRC message is identified, the UE 1h-01 may identify that the last N-th segmented RRC message is the last segment through the last segment indicator. In step 1h-40, the UE 1h-01 may recover all the segment messages into the original RRCResume message by decoding all the segment messages. In this case, the UE 1h-01 may stop the T319 timer (1h-45). In step 1h-50, the UE 1h-01 may deliver an RRC message (e.g., an RRCResumeComplete message) to the base station (Cell 2, 1h-03) that has delivered the RRCResume message, and may finish the RRC connection procedure. Thereafter, in step 1h-55, the UE 1h-01 may perform data transmission and reception in the RRC connected state with the base station 1h-03.

In steps 1h-35 to 1h-40, there may be a time difference until the UE 1h-01 recovers the original RRCResume message after receiving all the segments from the moment when the UE receives the first segment of the RRC message (e.g., an RRCResume message). If a corresponding RRC message (e.g., an RRCResume message) has not been segmented, T319 may be stopped at the moment when the first segment message is received and the RRC operation may continue. However, if the corresponding RRC message has been segmented, stop timing of T319 may be further increased. The base station 1h-03 attempts to make the UE 1h-01 transition to a connected state by indicating RRC Resume, but an operation of the UE 1h-01 transitioning to RRC IDLE may occur because the T319 timer expires due to an increase of the time taken to transmit and process all the segments. Embodiment 3 of the disclosure proposes a method for solving such a problem.

Figure 1I:
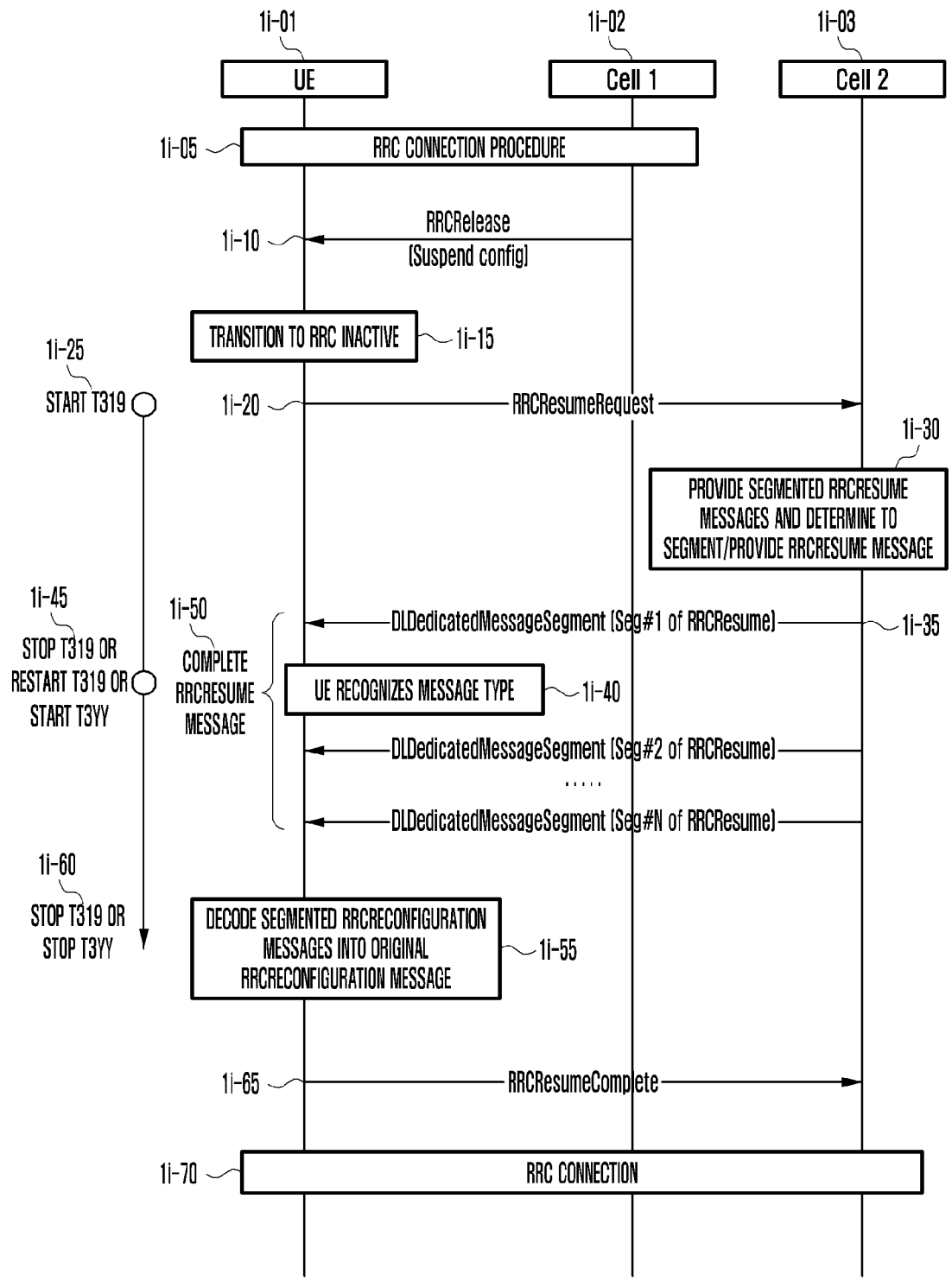
FIG. 1I is Embodiment 3 to which the disclosure is applied, illustrates an overall operation in a situation in which segmentation is applied to a DL RRC message, and is a diagram illustrating a method of preventing T319 from expiring while a segmented RRC message is received.

FIG. 1I is Embodiment 3 to which the disclosure is applied, illustrates an overall operation in a situation in which segmentation is applied to a DL RRC message, and is a diagram illustrating a method of preventing T319 from expiring while a segmented RRC message is received. The RRC message may be an RRCResume message.

A UE 1i-01 needs to receive configuration information for the transmission and reception of data to and from a serving base station (eNB or gNB, Cell 1 1i-02 in the drawing) in the state (1i-05) in which the UE has been connected to the base station. In step 1i-05, the UE 1i-01 and the base station 1i-02 may perform a series of operations of requesting and delivering UE capability information. In the corresponding step, if the UE 1i-01 delivers the UE capability information to the base station 1i-02, the UE capability information may include information indicating whether segmentation for an UL/DL RRC message is supported. In the method of delivering the UE capability, UL/DL capabilities may be separately indicated for each RAT type. For example, the capability to support segmentation for an UL/DL RRC message in LTE and the capability to support segmentation for an UL/DL RRC message in NR may be separately delivered. For reference, specific cell-based timer information may be delivered to the UE 1i-01 in system information (SIB1). Referring to Table 4, T319 referred in the present embodiment is also included in the system information (SIB1).

TABLE 4

| | |
|---|---|
| UE-TimersAndConstants ::= | SEQUENCE { |
| t300 | ENUMERATED {ms100, ms200, ms300, ms400, ms600, ms1000, ms1500, ms2000}, |
| t301 | ENUMERATED {ms100, ms200, ms300, ms400, ms600, ms1000, ms1500, ms2000}, |

TABLE 4-continued

| | |
|---|---|
| t310<br>ms1000, ms2000}, | ENUMERATED {ms0, ms50, ms100, ms200, ms500, |
| n310 | ENUMERATED {n1, n2, n3, n4, n6, n8, n10, n20}, |
| t311<br>ms15000, ms20000, ms30000}, | ENUMERATED {ms1000, ms3000, ms5000, ms10000, |
| n311 | ENUMERATED {n1, n2, n3, n4, n5, n6, n8, n10}, |
| t319<br>ms1000, ms1500, ms2000}, | ENUMERATED {ms100, ms200, ms300, ms400, ms600, |
| ... | |
| } | |

In step 1i-10, the base station 1i-02 may deliver an RRC message (e.g., an RRCRelease message) that makes the UE 1i-01 transition to an INACTIVE state due to a reason, such as a case where the transmission and reception of data to and from the UE 1i-01 are not performed for a given time and expected data transmission and reception are not present. The RRC message (e.g., an RRCRelease message) may include a suspend configuration indicative of a configuration to the INACTIVE state. For reference, suspend configuration information may include an I-RNTI, a RAN paging cycle, RAN notification area information, T380, a next hop chain count (NCC) value, etc. In step 1i-15, the UE 1i-01 that has received the message may transition to an RRC INACTIVE state.

Thereafter, the UE 1i-01 may need to transition to an RRC connected state for a reason, such as data generation from a higher layer. In step 1i-20, the UE 1i-01 may request an RRC resume operation from a specific base station (Cell 2, 1i-03) through an RRC message (e.g., an RRCResumeRequest message). If the Cell 1 1i-02 and a Cell 2 1i-03 are tied up in the same RAN notification area, an RRC resume procedure may be performed because context of the UE 1i-01 can be recovered between the corresponding cells. In step 1i-20, the UE 1i-01 may start the T319 timer (1i-25) simultaneously with the transmission of an RRC message (e.g., an RRCResumeRequest message). An operation of the base station 1i-03 that has received the RRC message may be different depending on a response to the message.

Reject an RRC Resume request
  RRCReject message delivery: instruct the UE to make an RRCResume request again (including a wait time)
  RRCRelease message delivery: make the UE transition to the RRC IDLE state
  Deliver an RRCRelease message (including a suspend configuration): make the UE transition to the RRC INACTIVE state
Approve an RRC Resume request
  If a corresponding cell can recover UE context: deliver RRCResume
  If a corresponding cell cannot recover UE context: deliver RRCSetup In particular, in the present embodiment, a scenario in which if the UE 1i-01 has requested RRCResumeRequest, the base station (Cell 2, 1i-03) may invoke UE context and permits the Resume request of the UE is taken into consideration. Referring to Table 5, the base station 1i-03 may generate the following RRC message (e.g., an RRCResume message). The message may include a master cell group configuration, a bearer configuration, a measurement configuration, etc.

TABLE 5

| | |
|---|---|
| RRCResume ::=<br>  rrc-TransactionIdentifier | SEQUENCE {<br>RRC-TransactionIdentifier, |

TABLE 5-continued

| | |
|---|---|
|   criticalExtensions<br>    rrcResume<br>    criticalExtensionsFuture<br>  }<br>} | CHOICE {<br>RRCResume-IEs,<br>SEQUENCE { } |
| RRCResume-IEs ::=<br>  radioBearerConfig<br>OPTIONAL, -- Need M<br>  masterCellGroup | SEQUENCE {<br>RadioBearerConfig<br><br>OCTET STRING (CONTAINING CellGroupConfig) |
| OPTIONAL, -- Need M<br>  measConfig<br>OPTIONAL, -- Need M<br>  fullConfig<br>OPTIONAL, -- Need N<br>  lateNonCriticalExtension<br>OPTIONAL,<br>  nonCriticalExtension<br>OPTIONAL<br>} | <br>MeasConfig<br><br>ENUMERATED {true}<br><br>OCTET STRING<br><br>RRCResume-v1560-IEs |
| RRCResume-v1560-IEs ::=<br>  radioBearerConfig2<br><br>OPTIONAL, -- Need M<br>  sk-Counter<br>OPTIONAL,<br>  nonCriticalExtension<br>OPTIONAL<br>} | SEQUENCE {<br>OCTET STRING (CONTAINING RadioBearerConfig)<br><br>SK-Counter<br><br>SEQUENCE { } |

In step 1i-30, the generated RRC message (e.g., an RRCResume message) may be greater than a maximum size of a PDCP SDU. In this case, the base station 1i-03 may segment the corresponding message. This may be a case where the UE 1i-01 has a segment processing capability for a DL RRC message. A segmented RRC message (e.g., an RRCResume message) may be included in the segmented RRC message (e.g., DLDedicatedMessageSegment) described with reference to FIG. 1E and delivered. That is, the entire RRC message (e.g., an RRCResume message) is segmented into segments having a 9000-byte size. The last segment may be a segment having a size left after the sum of segmented RRC messages is subtracted from the entire message size. In step 1i-35, the base station 1i-03 may sequentially deliver, to the UE 1i-01, the generated segmented RRC messages (e.g., DLDedicatedMessageSegment messages) from the first segment.

In an embodiment of the disclosure, when receiving the first segment message, the UE 1i-01 may be aware that the corresponding message is a segment for an RRC message (e.g., an RRCResume message) through the following method.

A method of being implicitly aware of a segment for an RRC message (no separate signaling): a method of a UE being aware that a corresponding segment message is for RRCResume because a response message for the delivery of RRCResumeRequest has been received as an RRC segment message. This corresponds to a case where a DL RRC segment message includes only an RRCReconfiguration message and an RRCResume message, and the reason for this is that there is no case where an RRCReconfiguration message is received as a response with respect to an RRCResumeRequest message.

A method of being aware of a segment for an RRC message through explicit signaling: a method of introducing an indicator indicative of an RRC message type into DLDedicatedMessageSegment and enabling a UE to be aware of the original RRC message associated with a corresponding message even though the UE receives only one segment message when receiving a segment RRC message as described with reference to FIG. 1E. This RRC message type may be included in only the first segment message or may be included in all segments.

A method of indicating an operation of a timer related to an RRC message: The introduction of the indicator indicative of an RRC message type has been described with reference to FIG. 1E. The indicator may be substituted with an indicator indicative of an operation of a timer related to an RRC message. For example, 0 may indicate that a current timer continues to operate and 1 may indicate that a timer currently operating is stopped by using a 1-bit indicator (the indication of 0 and 1 is not limited thereto and may be exchanged). Since a UE transmits an RRC resume request message and receives an RRC segment as a response thereto, the UE may identify that the corresponding message is an RRC resume message, and may control the driving of T319, that is, a timer related to an RRC resume message. For example, the UE may continue to operate the T319 timer being operating when the indicator is 0, and may stop the T319 timer being operating when the indicator is 1. Meanwhile, if the indicator is expanded, the number of bits of the indicator may be further expanded. For example, a bit of the indicator may correspond to a timer related to a different RRC message. For example, when the indicator is 2 bits, the first bit may correspond to the T319 timer related to RRCResume, and the second bit may correspond to T304 related to RRCreconfiguration. A UE may control an operation related to a timer corresponding to a location of a bit of the indicator.

The UE receives the first segment RRC message in step 1*i*-35 through the aforementioned method, and may be aware that the RRC message is which type of an RRC message in step 1*i*-40. The UE 1*i*-01 may control the received RRC message and an operation of a corresponding timer. For example, if a corresponding RRC message is identified as being RRCResume, the following method is present with respect to how the UE processes T319 that is operating. The following operation corresponds to step 1*i*-45.

1. A first method of processing the T319 timer: the UE may stop T319 because a segment for an RRCResume message has been identified, and may then perform the reception of a segment message (1*i*-50) and a recovery operation for the original RRCResume message (1*i*-55).
2. A second method of processing the T319 timer: the UE may restart the T319 timer because a segment for an RRCResume message has been identified, and may then wait for the reception of a segment message and a recovery operation for the original RRCResume message. The UE may stop T319 again (1*i*-60) until the reception of all segments is completed (1*i*-50) and an RRCResume message is recovered (1*i*-55).
3. A third method of processing the T319 timer: the UE may stop T319 because a segment for an RRCResume message has been identified, and may start a new timer T3yy. This is for waiting for an operation of subsequently receiving a segment message and recovering the original RRCResume message. The UE may stop T3yy (1*i*-60) when the reception of all segments is completed (1*i*-50) and an RRCResume message is recovered (1*i*-55). The T3yy may be configured through system information. If the capability of a UE supports a segmented RRC message, the T3yy may be configured through a dedicated RRC message. The dedicated RRC message may be an RRCreconfiguration message. Furthermore, the T3yy may be provided by being included in a segmented RRC message. If the T3yy is provided by being included in a segmented RRC message, a scaling factor value to be applied to the existing timer (e.g., T319) may be provided. For example, if 2 is provided as the scaling factor value, the length of T3yy may correspond to 2*T319. Meanwhile, the length of the T3yy may be configured as a length capable of receiving all of segmented RRC messages.

In step 1*i*-65, the UE 1*i*-01 may deliver an RRC message (e.g., RRCResumeComplete message) to the base station (Cell 2, 1*i*-03) that has delivered the RRC message (e.g., an RRCResume message), and may finish the connection procedure. Thereafter, in step 1*i*-70, the UE 1*i*-01 may perform data transmission and reception in RRC connected state with the base station 1*i*-03.

In the present embodiment, an RRCResume message and T319 are chiefly described as examples, but the scope of right of the disclosure is not limited thereto. The method may be identically applied to another RRC message in addition to the RRCresume message, and may be applied to various cases in which a timer that is operating has to be ended based on the reception of another RRC message in the same manner.

Meanwhile, an example in which the UE 1*i*-01 transmits an RRCResumeRequest message to the base station 1*i*-03 has been described. If the UE in the RRC inactive state is in cell coverage of the base station 1*i*-02, the UE may transmit an RRCResumeRequest message to the base station 1*i*-02. In this case, it is evident that the aforementioned operation of the base station 1*i*-03 may be performed by the base station 1*i*-02.

Figure 1J:
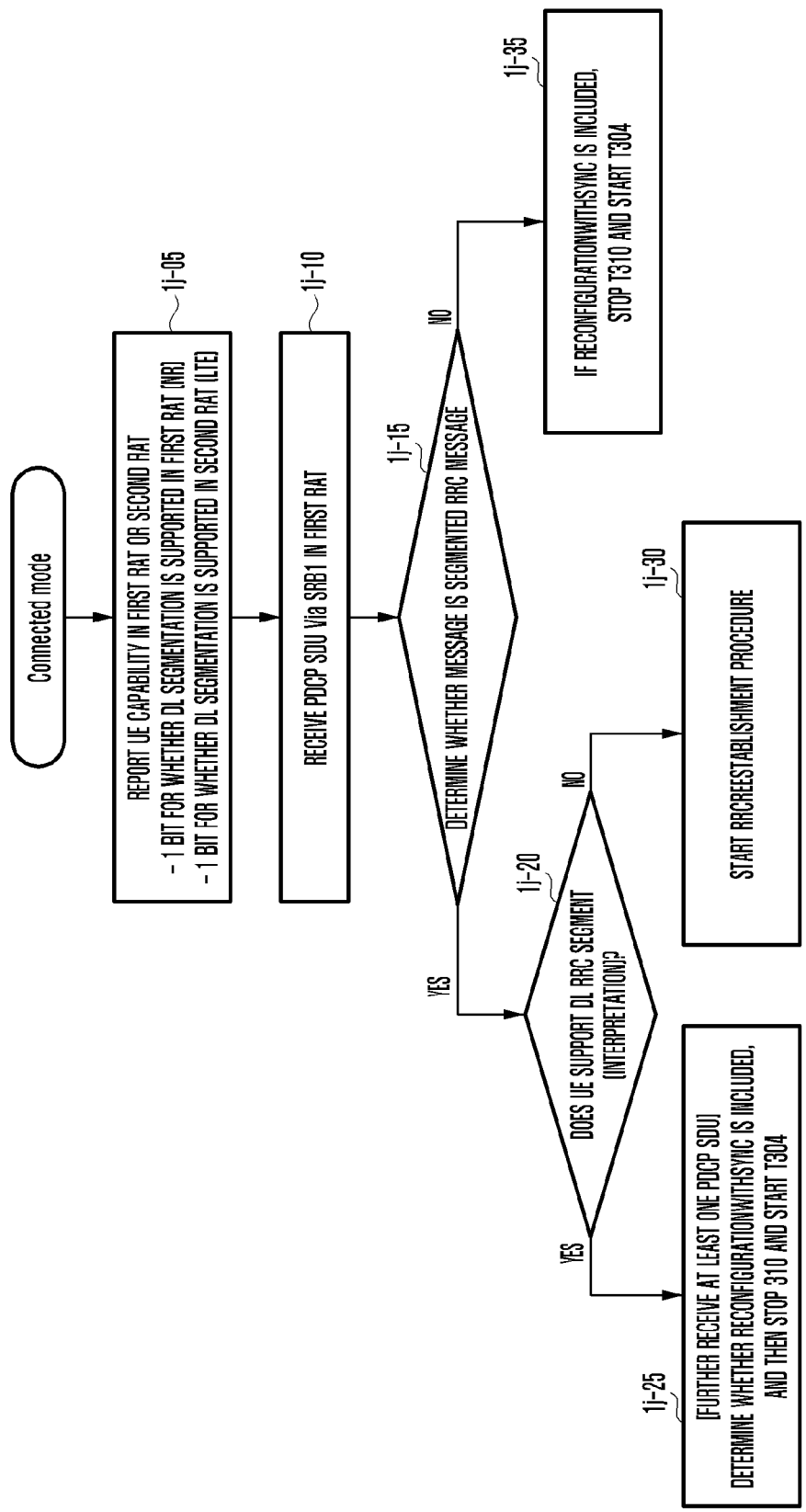
FIG. 1J is a terminal operation for Embodiment 1 of the disclosure, and is a diagram illustrating a method of applying segmentation to a DL RRC message in an RRCReconfiguration message including a handover configuration.

FIG. 1J is a UE operation for Embodiment 1 of the disclosure, and is a diagram illustrating a method of applying segmentation to a DL RRC message in an RRCReconfiguration message including a handover configuration. That is, FIG. 1J describes that segmentation for a DL RRC message relates to an RRC message (e.g., an RRCReconfiguration message) including a handover configuration, and is a case where a segmented RRC message is taken into consideration only when the segmented RRC message is for RRCReconfiguration and an RRCResume message is not segmented.

In step 1*j*-05, a UE in a connected state may perform a series of operations of requesting UE capability information and delivering the UE capability information to a base station. In step 1*j*-05, when the UE delivers the UE capability information to the base station, the UE capability information may include information indicating whether segmentation for an UL/DL RRC message is supported. In the method of delivering the UE capability, UL/DL capabilities may be separately indicated for each RAT type. For example, as follows, the capability to support segmentation for an UL/DL RRC message in LTE and the capability to support segmentation for an UL/DL RRC message in NR may be separately delivered.

1 bit for whether DL RRC segmentation is supported in a first RAT (NR)
    1 bit for whether DL RRC segmentation is supported in a second RAT (LTE)

In step 1j-10, the UE may receive a PDCP SDU through an SRB1 in the first RAT (NR). The PDCP SDU is a DL RRC message. In step 1j-15, an operation may be different depending on whether the corresponding message is a segmented RRC message. The operation may proceed to step 1j-20 if the corresponding message is a segmented RRC message, and may proceed to step 1j-35 if the corresponding message is not a segmented RRC message. If the received PDCP SDU is a segmented RRC message, in step 1j-20, the UE may identify whether a UE capability reported by the UE supports a DL RRC segment interpretation capability. If the DL RRC segment is supported, in step 1j-25, the UE may identify the original RRC message (e.g., an RRCReconfiguration message) by recovering received segment messages. If handover configuration information (reconfigWithSync) has been included in the message, that is, when the processing of the PDCP SDU is completed, the UE may start T304. In the above step, if the T310 timer that is operating is present, the UE may stop T310 and start T304. Alternatively, if a segment of an RRCReconfiguration message is included in the PDCP SDU and the UE has reported that it supports a DL segment with respect to the first RAT, the UE may further receive at least one PDCP SDU, may then determine whether handover configuration information (reconfigWithSync) is included in the at least one PDCP SDU, may stop T310, and may start T304. In this case, the reason why the UE further receives the at least one PDCP SDU assumes a case where whether reconfigWithSync has been included can be previously identified through partial decoding for a corresponding message, and means a case where handover configuration information (reconfigWithSync) is included in a subsequent segment not the first segment. That is, both a method of recovering an RRC message (e.g., an RRCReconfiguration message) after receiving all segment messages or a case where recovery is performed for each segment or an RRC message (e.g., an RRCReconfiguration message) including handover configuration information (reconfigWithSync) can be identified through a segment are assumed.

In step 1j-20, if a segment of an RRC message (e.g., an RRCReconfiguration message) is included in the corresponding PDCP SDU and the UE has reported that it does not support a DL segment with respect to the first RAT, the UE may perform an RRCReestablishment procedure (step 1j-30). The reason for this is that a handover command cannot be performed because there is no interpretation capability for the received segment message. Furthermore, step 1j-20 may be omitted. That is, the UE has already delivered the UE capability, and the base station that delivers the segment RRC message will deliver the segment RRC message by taking into consideration the UE capability. Accordingly, the corresponding step may be an unnecessary operation because it may be considered that the corresponding operation has already been performed by the base station not the UE.

In step 1j-15, if the received PDCP SDU is not a segmented RRC message, in step 1j-35, the UE may determine whether handover configuration information (reconfigWith-Sync) is included in the received RRCReconfiguration message. If the corresponding handover configuration information (ReconfigWithSync) is included in the received RRCReconfiguration message, the UE may stop T310 and start T304.

Figure 1K:
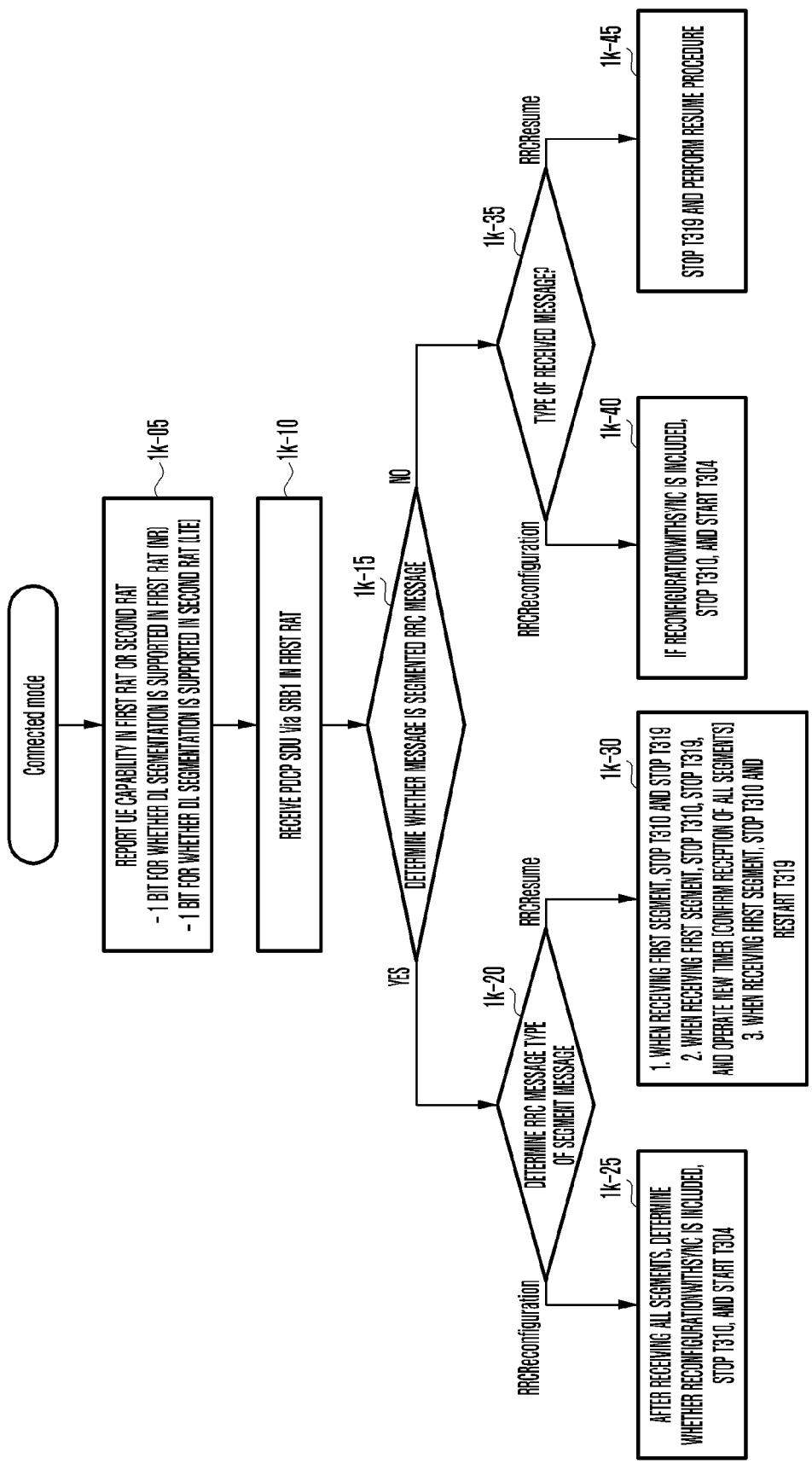
FIG. 1K is a terminal operation for Embodiment 1, Embodiment 2, and Embodiment 3 of the disclosure, and is a diagram illustrating a method of applying segmentation to a DL RRC message in an RRCResume message including a handover configuration.

FIG. 1K is a UE operation for Embodiment 1, Embodiment 2, and Embodiment 3 of the disclosure, and is a diagram illustrating a method of applying segmentation to a DL RRC message in an RRCResume message including a handover configuration. That is, FIG. 1K is a description when segmentation for a DL RRC message relates to an RRC message (e.g., an RRCResume message) including a handover configuration.

In step 1k-05, a UE in a connected state may perform a series of operations of requesting UE capability information and delivering the UE capability information to a base station. In step 1k-05, when the UE delivers the UE capability information to the base station, the UE capability information may include information indicating whether segmentation for an UL/DL RRC message is supported. In the method of delivering the UE capability, UL/DL capabilities may be separately indicated for each RAT type. For example, as follows, the capability to support segmentation for an UL/DL RRC message in LTE and the capability to support segmentation for an UL/DL RRC message in NR may be separately delivered.

1 bit for whether DL RRC segmentation is supported in a first RAT (NR)
    1 bit for whether DL RRC segmentation is supported in a second RAT (LTE)

In step 1k-10, the UE may receive a PDCP SDU through an SRB1 in the first RAT (NR). The PDCP SDU is a DL RRC message. In step 1k-15, an operation may be different depending on whether the corresponding message is a segmented RRC message. If the received PDCP SDU is a segmented RRC message, in step 1k-20, the UE may determine the original RRC message type of the received segment RRC message. In this case, the following method described with reference to FIG. 1I is possible.

A method of being implicitly aware of a segmented RRC message (no separate signaling): a UE can be naturally aware of a segmented RRC message based on the state in which a segment message is received. A UE in the connected state may be aware that a segment message is an RRCReconfiguration message when receiving the segment message. A UE in the INACTIVE state may be aware that a segment message is an RRCResume message when receiving the segment message. In other words, this method is a method of allowing the UE to be aware that a segment message relates to RRCResume because a response message for RRCResumeRequest delivered by the UE has been received as an RRC segment message. The reason for this is that this corresponds to a case where a DL RRC segment message includes only an RRCReconfiguration message and an RRCResume message and there is no case where an RRCReconfiguration message is received as a response to an RRCResumeRequest message.

A method of being aware of a segmented RRC message through explicit signaling: a method of allowing the UE to be aware that a corresponding message is the original RRC message associated therewith although the UE receives only one segment message when receiving a segment RRC message by introducing an indicator indicative of an RRC message type within DLDedicatedMessageSegment as described with reference to FIG.

1E. This RRC message type may be included in only the first segment message or may be included in all segments.

A method of indicating an operation of a timer related to an RRC message: The introduction of the indicator indicative of an RRC message type has been described with reference to FIG. 1E. The indicator may be substituted with an indicator indicative of an operation of a timer related to an RRC message.

In the above step, if the segment RRC message is a segment of an RRCReconfiguration message, after receiving all segments, the UE may recover all the segments into the original RRCReconfiguration message, may determine whether ReconfigurationWithSync is included, may stop T310, and may start T304 (step 1k-25). Thereafter, the UE may perform a handover/PSCell change operation based on a configuration. In step 1k-20, if the segment RRC message is a segment of an RRCResume message, the UE may perform one operation of the following three options described with reference to FIG. 1I (step 1k-30). The following options are operations proposed in the disclosure.

1. A first method of processing the T319 timer: the UE may stop T319 because a segment for an RRCResume message has been identified, and may perform the reception of a subsequent segment message and a recovery operation for the original RRCResume message.
2. A second method of processing the T319 timer: the UE may restart the T319 timer because a segment for an RRCResume message has been identified, and may then wait for the reception of a segment message and a recovery operation for the original RRCResume message. The UE may stop T319 again until the reception of all the segments is completed and an RRCResume message is recovered.
3. A third method of processing the T319 timer: the UE may stop T319 because a segment for an RRCResume message has been identified, and may start a new timer T3yy. This is for waiting for the reception of a subsequent segment message and a recovery operation for the original RRCResume message. The UE may stop T3yy when the reception of all the segments is completed and an RRCResume message is recovered.

If the PDCP SDU received in step 1k-15 is not a segmented RRC message, in step 1k-35, the UE may identify the type of received RRC message. If the received message is an RRCReconfiguration message, in step 1k-40, the UE may determine whether handover configuration information (reconfigWithSync) is included. If the corresponding handover configuration information (reconfigWithSync) is included, the UE may stop T310, and may start T304. In step 1k-35, if the identified received message is an RRCResume message, the UE may stop T319 and perform a Resume procedure. Meanwhile, the type of segmented RRC message is not limited to an RRCReconfiguration message and an RRCResume message, and may also be applied to another DL RRC message that supports a segment.

Figure 1L:
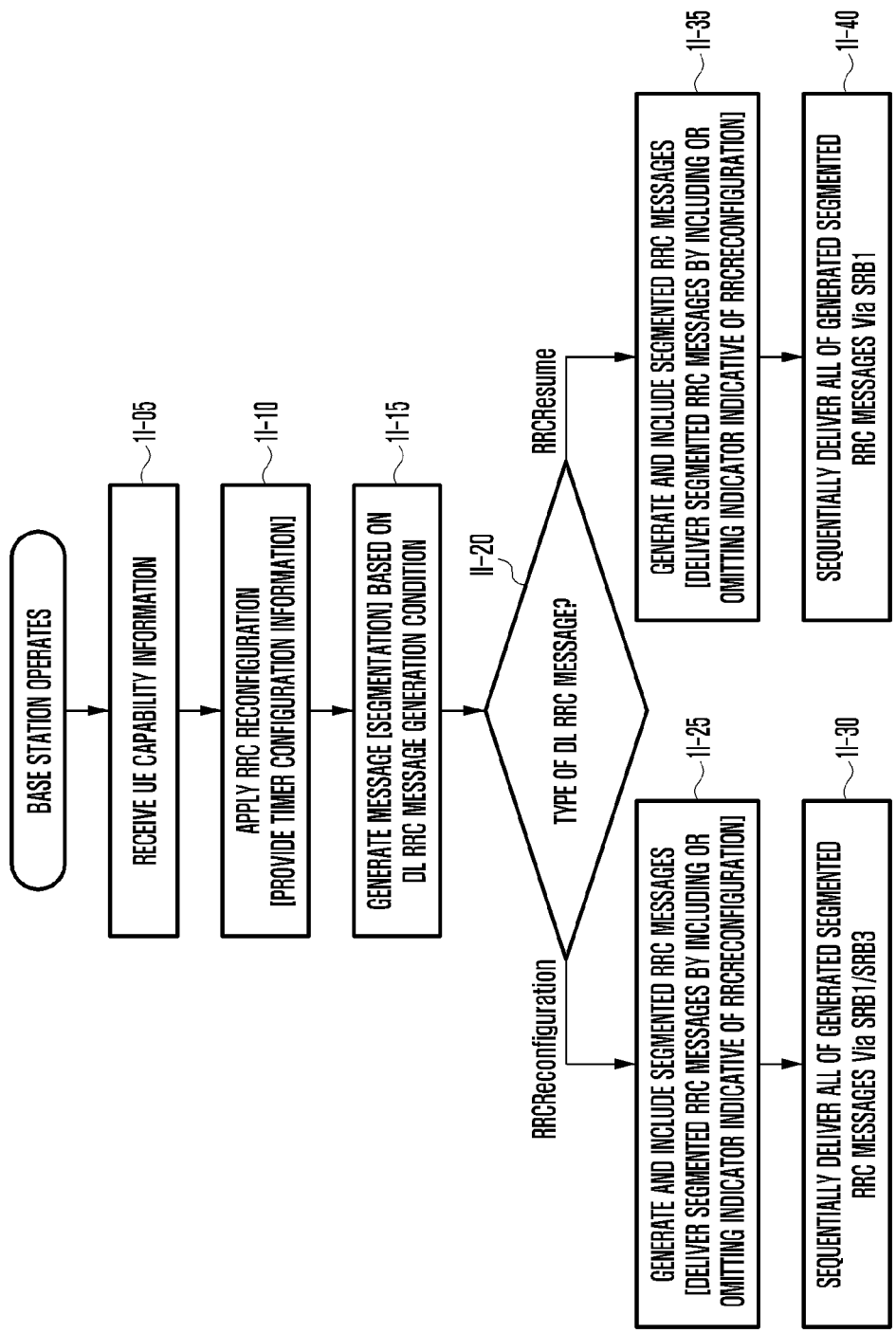
FIG. 1L is a diagram illustrating the entire base station operation applied to embodiments of the disclosure.

FIG. 1L is a diagram illustrating the entire base station operation applied to embodiments of the disclosure.

In step 1l-05, a base station may perform a series of operations of requesting UE capability information from a UE and receiving the corresponding capability information from the UE. In step 1l-05, if the UE delivers the UE capability information to the base station, the UE capability information may include information indicating whether segmentation for an UL/DL RRC message is supported. In the method of delivering the UE capability, UL/DL capabilities may be separately indicated for each RAT type. For example, as follows, the capability to support segmentation for an UL/DL RRC message in LTE and the capability to support segmentation for an UL/DL RRC message in NR may be separately delivered.

1 bit for whether DL RRC segmentation is supported in a first RAT (NR)
1 bit for whether DL RRC segmentation is supported in a second RAT (LTE)

In step 1l-10, the base station may provide a connected state configuration with the UE by delivering an RRC reconfiguration message with reference to the UE capability information received in the above step. The RRC reconfiguration message may include information of a timer related to an RRC message. For example, the RRC reconfiguration message may include information on a timer to be applied when a segmented RRC message is received.

Thereafter, in step 1l-15, the base station may generate and deliver a message based on a specific DL RRC message generation condition, and may perform segmentation if necessary. In step 1l-15, corresponding segmentation may be applied only when a UE capability is supported. In step 1-20, an operation may be different depending on the type of DL RRC message.

If the generated DL RRC message is an RRCReconfiguration message, that is, if the RRCReconfiguration message has been segmented to have a size greater than a maximum size of a PDCP SDU, in step 1l-25, the base station may apply segmentation to the corresponding message, and may generate a DLDedicatedMessageSegment message by including the message in the DLDedicatedMessageSegment message. In the above step, an indicator indicating that a segment included in the corresponding DLDedicatedMessageSegment corresponds to which RRC message type may be included. In step 1l-30, the base station may sequentially deliver, to the UE, all of segmented RRC messages generated above through an SRB1/SRB3.

In step 1l-20, if the generated DL RRC message is an RRCResume message, that is, if the RRCResume message has been segmented to have a size greater than a maximum size of a PDCP SDU, in step 1l-35, the base station may apply segmentation to the corresponding message, and may generate a DLDedicatedMessageSegment message by including the message in the DLDedicatedMessageSegment message. In the above step, an indicator indicating that a segment included in the corresponding DLDedicatedMessageSegment corresponds to which RRC message type may be included. In step 1l-40, the base station may sequentially deliver, to the UE, all of segmented RRC messages generated above through an SRB1.

Meanwhile, in operation 1j-20, the base station may perform a different operation depending on a DL RRC message transmitted by the base station and whether a timer operation related to the DL RRC message needs to be adjusted. For example, an indicator indicating whether a timer-related operation needs to be adjusted instead of information indicative of the type of message may be included. If an RRC Reconfiguration message has been segmented, if the base station determines that adjustment for a timer-related operation is not necessary, the base station indicates a value 0 as the indicator. In this case, after receiving all of segmented RRC messages, the UE may perform a timer operation related to the RRC reconfiguration message. In contrast, if an RRC resume message has been segmented, the base station may determine that a timer-related operation needs to be adjusted. In this case, the base station indicates a value 1 as the indicator. In this case, when receiving the first segmented RRC message, the UE may perform a timer-related operation, such as that described in the embodiment of FIG. 1I.

Figure 1M:
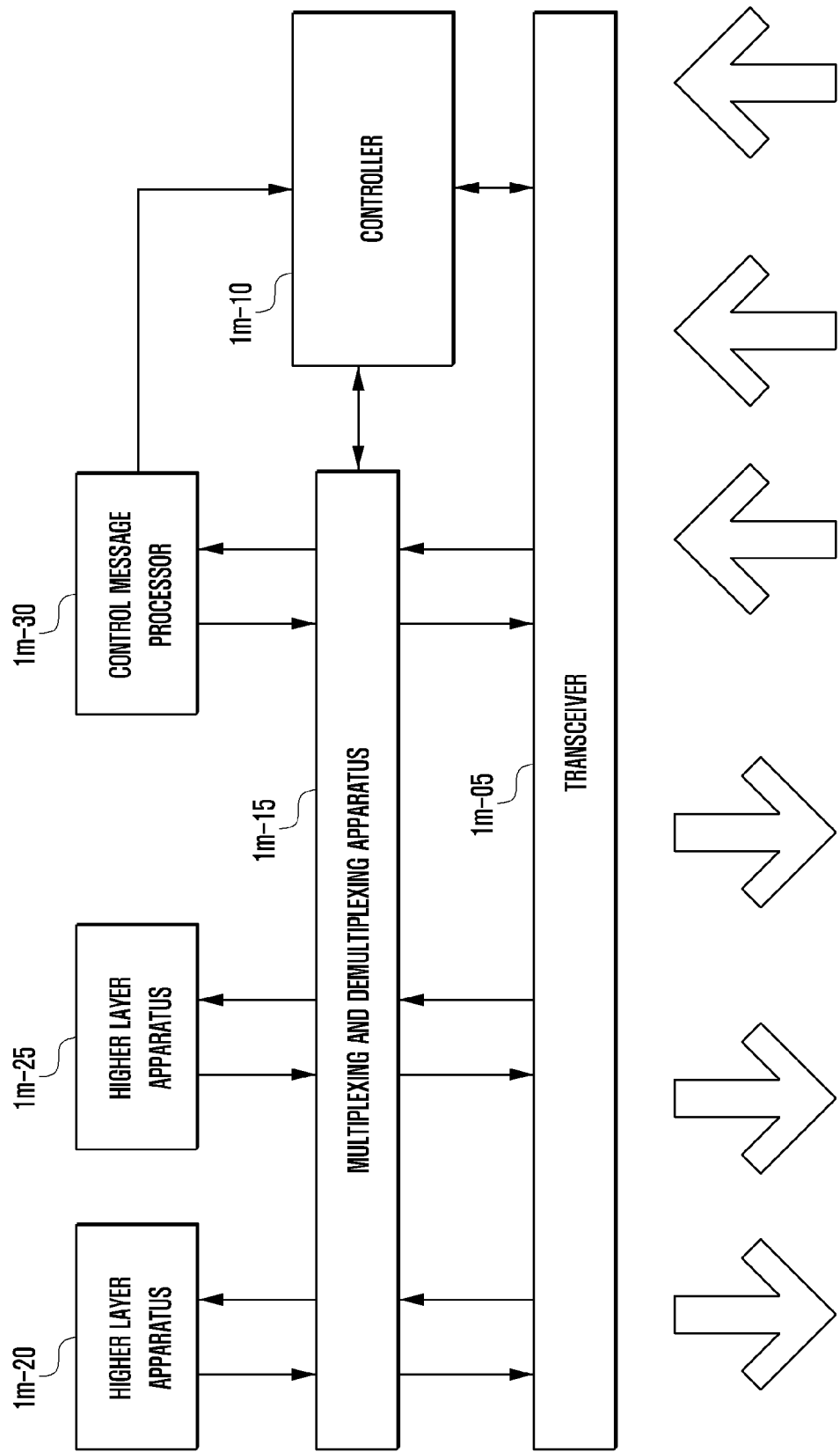
FIG. 1M is a diagram illustrating a block construction of a terminal according to an embodiment of the disclosure.

FIG. 1M is a diagram illustrating a block constitution of a UE according to an embodiment of the disclosure.

As illustrated in FIG. 1M, the UE according to an embodiment of the disclosure includes a transceiver 1*m*-05, a controller 1*m*-10, a multiplexing and demultiplexing apparatus 1*m*-15, various higher layer processing apparatuses 1*m*-20 and 1*m*-25, and a control message processor 1*m*-30.

The transceiver 1*m*-05 receives data and a predetermined control signal through a forward channel of a serving cell, and transmits data and a predetermined control signal through a backward channel. If multiple serving cells have been configured, the transceiver 1*m*-05 performs data transmission and reception and control signal transmission and reception through the multiple serving cells. The multiplexing and demultiplexing apparatus 1*m*-15 functions to multiplex data generated from the higher layer processing apparatus 1*m*-20, 1*m*-25 or the control message processor 1*m*-30 or demultiplexes data received from the transceiver 1*m*-05 and to deliver the data to a proper higher layer processing apparatus 1*m*-20, 1*m*-25 or the control message processor 1*m*-30. The control message processor 1*m*-30 adopts a necessary operation by transmitting and receiving control messages from a base station. In this case, the necessary operation includes a function for processing a control message, such as an RRC message and a MAC CE, and includes the reception of an RRC message for the report of a CBR measured value, a resource pool, and a UE operation. The higher layer processing apparatus 1*m*-20, 1*m*-25 means a DRB apparatus, and may be constructed for each service. The higher layer processing apparatus 1*m*-20, 1*m*-25 processes data generated in a user service, such as a file transfer protocol (FTP) or a voice over Internet protocol (VoIP), and delivers the data to the multiplexing and demultiplexing apparatus 1*m*-15 or processes data delivered by the multiplexing and demultiplexing apparatus 1*m*-15 and delivers the data to a service application of a higher layer. The controller 1*m*-10 controls the transceiver 1*m*-05 and the multiplexing and demultiplexing apparatus 1*m*-15 by identifying a scheduling command received through the transceiver 1*m*-05, for example, backward grants so that backward transmission is performed through a proper transmission resource at proper timing. Meanwhile, an example in which the UE includes a plurality of blocks and the blocks perform different functions has been described. However, this is merely an embodiment, and the disclosure is not essentially limited thereto. For example, a function performed by the demultiplexing device 1*m*-15 may be performed by the controller 1*m*-10 itself. The controller 1*m*-05 may include a controller or at least one processor. Furthermore, the controller 1*m*-05 may control operations of the UE according to various embodiments of the disclosure.

Figure 1N:
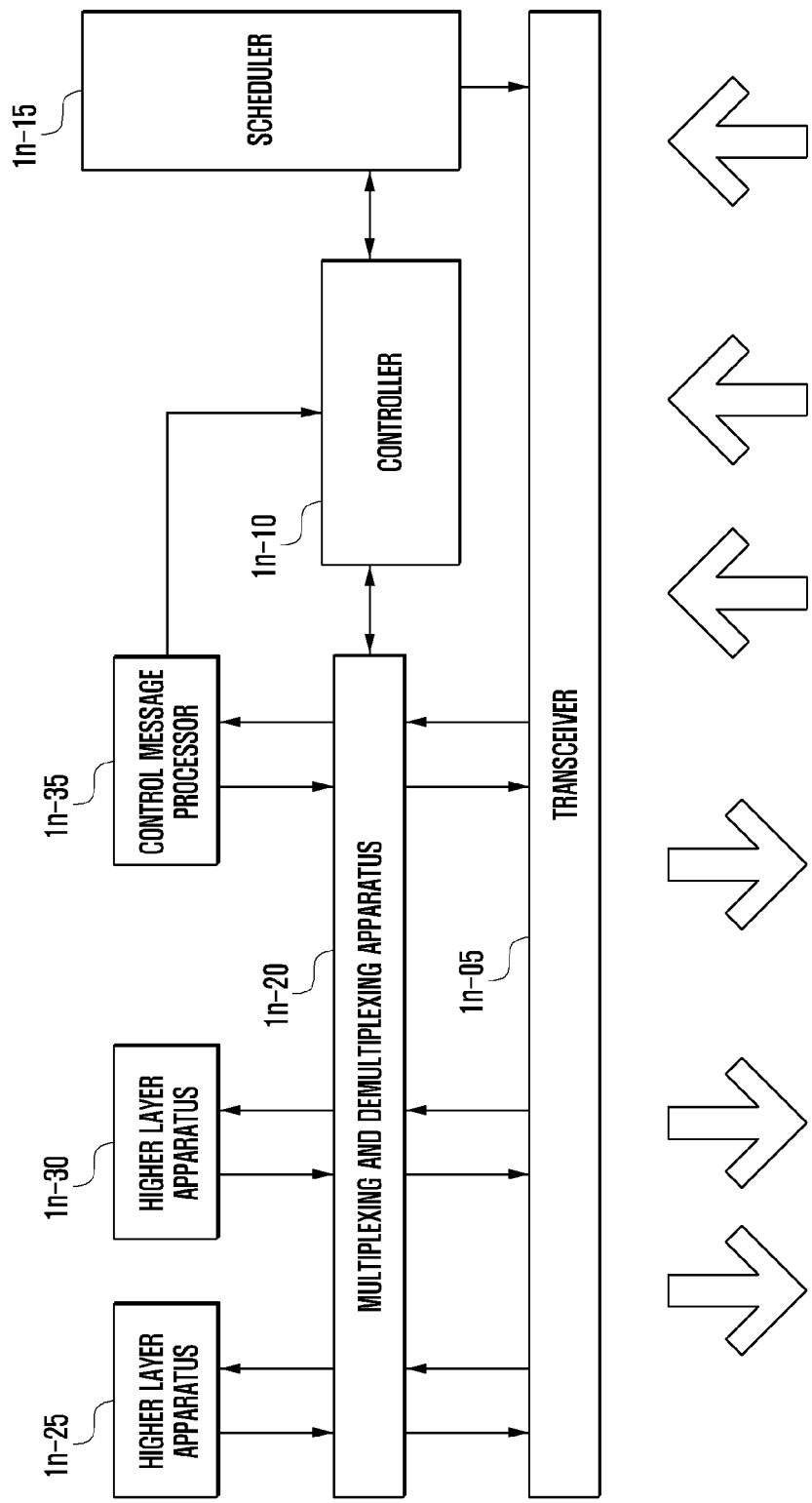
FIG. 1N is a diagram illustrating a block constitution of a base station according to an embodiment of the disclosure.

FIG. 1N is a diagram illustrating a block construction of a base station according to an embodiment of the disclosure.

In FIG. 1N, the base station apparatus includes a transceiver 1*n*-05, a controller 1*n*-10, a multiplexing and demultiplexing apparatus 1*n*-20, a control message processor 1*n*-35, various higher layer processing apparatuses 1*n*-25 and 1*n*-30, and a scheduler 1*n*-15.

The transceiver 1*n*-05 transmits data and a predetermined control signal through a forward carrier, and receives data and a predetermined control signal through a backward carrier. If multiple carriers have been configured, the transceiver 1*n*-05 performs data transmission and reception and control signal transmission and reception through multiple carriers. The multiplexing and demultiplexing apparatus 1*n*-20 function to multiplex data generated from the upper layer processing apparatus 1*n*-25, 1*n*-30 or the control message processor 1*n*-35 or demultiplex data received from the transceiver 1*n*-05 and to deliver the data to a proper upper layer processing apparatus 1*n*-25, 1*n*-30 or the control message processor 1*n*-35, or the controller 1*n*-10. The control message processor 1*n*-35 generates a message to be delivered to a UE in response to an instruction from the controller 1*n*-10, and delivers the message to a lower layer. The upper layer processing apparatus 1*n*-25, 1*n*-30 may be constructed for each UE for each service, and processes data generated in a user service, such as an FTP or a VoIP, and delivers the data to the multiplexing and demultiplexing apparatus 1*n*-20 or processes data delivered by the multiplexing and demultiplexing apparatus 1*n*-20 and delivers the data to a service application of a upper layer. The scheduler 1*n*-15 allocates a transmission resource to a UE at proper timing by taking into consideration a buffer state of the UE, a channel state, an active time of the UE, etc., and processes a signal transmitted by the UE or processes the transmission of a signal to the UE with respect to the transceiver. The controller 1*n*-10 may include a controller or at least one processor. Furthermore, the controller 1*n*-01 may control operations of the base station according to various embodiments of the disclosure.

In the aforementioned detailed embodiments of the disclosure, the components included in the disclosure have been expressed in the singular or plural form depending on a proposed detailed embodiment. However, the singular or plural expression has been selected suitably for a situation proposed for convenience of description, and the disclosure is not limited to singular or plural components. Although a component has been expressed in the plural form, it may be configured in the singular form. Although a component has been expressed in the singular form, it may be configured in the plural form.

Meanwhile, although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims, but equivalents thereof.

The invention claimed is:

1. A method performed by a user equipment (UE), in a radio resource control (RRC) inactive state, in a wireless communication system, the method comprising:
   transmitting, to a base station, an RRC resume request;
   starting a timer simultaneously with the transmission of the RRC resume request;
   receiving, from the base station, a plurality of segmented RRC messages related to an RRC resume, wherein an RRC message related to the RRC resume is segmented into the plurality of segmented RRC messages, in case that a size of the RRC message related to the RRC resume is greater than a threshold;
   reassembling all of segmented RRC messages related to the RRC resume into the RRC message related to the RRC resume by decoding all of segmented RRC messages; and
   stopping the timer.

2. The method of claim 1, further comprising:
   restarting the timer simultaneously with receiving at least one of the plurality of segmented RRC messages related to the RRC resume.

3. The method of claim 1, further comprising:
starting a second timer simultaneously with receiving at least one of the plurality of segmented RRC messages related to the RRC resume; and
stopping the second timer.

4. The method of claim 1,
wherein the timer is a T319 timer, and
wherein the RRC message is an RRCResume message.

5. A method by a base station in a wireless communication system, the method comprising:
receiving, from a user equipment (UE) in a radio resource control (RRC) inactive state, an RRC resume request;
segmenting an RRC message related to an RRC resume into a plurality of segmented RRC messages, in case that a size of the RRC message related to the RRC resume is greater than a threshold; and
transmitting, to the UE, the plurality of segmented RRC messages related to the RRC resume,
wherein a timer is started simultaneously with transmission of the RRC resume request,
wherein the timer is stopped, and
wherein all of segmented RRC messages related to the RRC resume are reassembled into the RRC message related to the RRC resume by decoding all of the segmented RRC messages.

6. The method of claim 5, wherein the timer is restarted simultaneously with receiving at least one of the plurality of segmented RRC messages related to the RRC resume.

7. The method of claim 5,
wherein a second timer is restarted simultaneously with receiving at least one of the plurality of segmented RRC messages related to the RRC resume, and
wherein the second timer is stopped.

8. The method of claim 5,
wherein the timer is a T319 timer, and
wherein the RRC message is an RRCResume message.

9. A user equipment (UE) in a radio resource control (RRC) inactive state, the UE comprising:
a transceiver; and
a controller coupled to the transceiver,
wherein the controller is configured to:
transmit, to a base station, an RRC resume request,
start a timer simultaneously with the transmission of the RRC resume request,
receive, from the base station, a plurality of segmented RRC messages related to an RRC resume, wherein an RRC message related to the RRC resume is segmented into the plurality of segmented RRC messages, in case that a size of the RRC message related to the RRC resume is greater than a threshold,
reassemble all of segmented RRC messages related to the RRC resume into the RRC message related to the RRC resume by decoding all of segmented RRC messages, and
stop the timer.

10. The UE of claim 9, wherein the controller is further configured to:
restart the timer simultaneously with receiving at least one of the plurality of segmented RRC messages related to the RRC resume.

11. The UE of claim 9, wherein the controller is further configured to:
start a second timer simultaneously with receiving at least one of the plurality of segmented RRC messages related to the RRC resume, and
stop the second timer.

12. The UE of claim 9,
wherein the timer is a T319 timer, and
wherein the RRC message is an RRCResume message.

13. A base station comprising:
a transceiver; and
a controller coupled to the transceiver,
wherein the controller is configured to:
receive, from a user equipment (UE) in a radio resource control (RRC) inactive state, an RRC resume request,
segment an RRC message related to an RRC resume into a plurality of segmented RRC messages, in case that a size of the RRC message related to the RRC resume is greater than a threshold, and
transmit, to the UE, the plurality of segmented RRC messages related to the RRC resume,
wherein a timer is started simultaneously with transmission of the RRC resume request,
wherein the timer is stopped, and
wherein all of segmented RRC messages related to the RRC resume are reassembled into the RRC message related to the RRC resume by decoding all of the segmented RRC messages.

14. The base station of claim 13, wherein the timer is restarted simultaneously with receiving at least one of the plurality of segmented RRC messages related to the RRC resume.

15. The base station of claim 13,
wherein a second timer is restarted simultaneously with receiving at least one of the plurality of segmented RRC messages related to the RRC resume,
wherein the second timer is stopped,
wherein the timer is a T319 timer, and
wherein the RRC message is an RRCResume message.

* * * * *